US012116529B1

(12) United States Patent
Mohammed et al.

(10) Patent No.: US 12,116,529 B1
(45) Date of Patent: Oct. 15, 2024

(54) METHOD FOR SAND CONSOLIDATION USING ENFORCED CALCIUM AND MAGNESIUM FLUORIDE PRECIPITATION

(71) Applicant: KING FAHD UNIVERSITY OF PETROLEUM AND MINERALS, Dhahran (SA)

(72) Inventors: Amjed Mohammed Hassan Sheikh Mohammed, Dhahran (SA); Mohamed Ahmed Nasr Eldin Mahmoud, Dhahran (SA); Sidqi Ahmad Abu-Khamsin, Dhahran (SA); Ammar Husseiny Aly El-Husseiny, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/449,372

(22) Filed: Aug. 14, 2023

(51) Int. Cl.
*C09K 8/57* (2006.01)

(52) U.S. Cl.
CPC .................... *C09K 8/572* (2013.01)

(58) Field of Classification Search
None
See application file for complete search history.

(56) References Cited

U.S. PATENT DOCUMENTS

| 8,124,571 B2 * | 2/2012 | Harris ............... C09K 8/572 507/141 |
| 10,723,935 B2 | 7/2020 | Jamison et al. |
| 11,441,396 B1 | 9/2022 | Abu-Khamsin et al. |
| 2008/0135242 A1* | 6/2008 | Lesko ............... C09K 8/665 166/280.1 |
| 2014/0363240 A1 | 12/2014 | Putman et al. |
| 2022/0389305 A1 | 12/2022 | Zakaria |

FOREIGN PATENT DOCUMENTS

CN 102584275 B 12/2013

OTHER PUBLICATIONS

Choi et al. ; Review on geotechnical engineering properties of sands treated by microbially induced calcium carbonate precipitation (MICP) and biopolymers ; Construction and Building Materials 246; Feb. 22, 2020 ; 14 Pages.

* cited by examiner

*Primary Examiner* — Anuradha Ahuja
(74) *Attorney, Agent, or Firm* — Oblon, McClelland, Maier & Neustadt, L.L.P.

(57) ABSTRACT

A method for consolidating a subterranean geologic formation is provided. The method includes injecting a first composition, a second composition, and a third composition into the subterranean geologic formation. The first composition includes CaO, the second composition includes MgO, and the third composition includes $NH_4HF_2$. The method includes injecting at least one thermochemical fluid into the subterranean geologic formation to raise a temperature of the subterranean geologic formation to at least 120° C. The method includes reacting the third composition respectively with the first composition and the second composition to form $CaF_2$ and $MgF_2$ in the subterranean geologic formation. The method includes precipitating the $CaF_2$ and the $MgF_2$ on sand grains of the subterranean geologic formation to bind the sand grains together into a consolidated matrix in the subterranean geologic formation.

15 Claims, 23 Drawing Sheets

METHOD FOR SAND CONSOLIDATION USING ENFORCED CALCIUM AND MAGNESIUM FLUORIDE PRECIPITATION

STATEMENT REGARDING PRIOR DISCLOSURE BY THE INVENTORS

Aspects of the present disclosure are related to U.S. Pat. No. 11,441,396, titled "Sand Consolidation for Subterranean geologic formations," which is incorporated herein by reference in its entirety.

Aspects of the present disclosure are described in Hassan, A., Mahmoud, M., Abu-Khamsin, S., El-Husseiny, A., and Al-Karnos, A., "Sand Consolidation Using Enforced Calcium and Magnesium Fluoride Precipitation." *ASME. J. Energy Resour. Technol.* July 2023; 145 (7); 072601. https://doi.org/10.1115/1.4056641 which is incorporated herein by reference in its entirety.

BACKGROUND

Technical Field

The present disclosure is directed to sand consolidation for subterranean geologic formations, and more particularly, to a method for sand consolidation to minimize sand production and strengthen sandstone formations.

Description of Related Art

The "background" description provided herein is to generally present the context of the disclosure. Work of the presently named inventors, to the extent it is described in this background section, as well as aspects of the description which may not otherwise qualify as prior art at the time of filing, are neither expressly or impliedly admitted as prior art against the present invention.

Sand production is one of the most challenging problems affecting oil or gas production. Sand production, also known as sanding, is a common problem that occurs in unconsolidated formations. The sand particles can accumulate around the wellbore and restrict fluid flow from the reservoir to the wellbore thereby leading to a significant reduction in hydrocarbon production. During production, changes in the stress distribution can induce sand migration. For example, sand particles can migrate toward the wellbore and plug the perforations. High production rates can lead to considerable sand migration due to the high drag forces. Migrated sand particles can then damage downhole equipment as well as surface facilities.

Several treatments are used to minimize the damage induced by sand production, and particularly, mechanical and chemical methods are employed. Mechanical systems such as gravel packs and screens are used to hold the sand practices; however, accumulated sand can plug these screens and reduce their efficiency. Therefore, workover operations are frequently applied to clean the sand from the screens and restore their performance. Such operations will increase the overall cost and lead to interrupted hydrocarbon production.

On the other hand, chemical methods can be applied to increase the formation strength and minimize the possibility of sand detachment. Different chemicals can be injected into the unconsolidated formations to consolidate the particles and prevent the grains' dislodgement.

In-situ sand consolidation is one of the most effective treatments that can minimize sand production problems. Different types of consolidating chemicals can be injected before hydrocarbon production. The selection of the consolidating chemicals depends on the cost, the formation properties, operation conditions, and the retained permeability. Furthermore, several factors can affect the possibility of sand production, including the presence of water, the formation pressure, and the production rate. Water can dissolve the cementing materials, reducing the formation strength, and hence more sand production is induced. The pore pressure is a major factor that affects sand production since it supports the gains against overburdening stress. During production, the pore pressure is reduced, leading to changes in the stress distribution, and thereby the sand particles can be detached from the matrix. Finally, higher production rates can increase erosion forces, yielding sand failure and severe solid production.

U.S. Pat. No. 10,723,935B2 relates to calcium carbonate lost circulation material morphologies for subterranean formation operations. A calcium treatment fluid is introduced and reacted to form precipitated calcium carbonate, including calcium chloride and ammonium chloride. In addition, hydrochloric acid is utilized as an etching acid.

US20220389305A1 relates to using an aqueous fluid for controlling acid release into a well. The aqueous fluid includes an acid-generating ammonium salt and a breaker. Hydrochloric acid is utilized as an etching acid, and ammonium chloride as a reactant fluid. However, US20220389305A1 relates to the controlled release of acid into a well and not the formation of a sand matrix.

US20140363240A1 discloses a method for consolidating and mechanically strengthening soil and/or sand. Calcium chloride, calcium oxide, and magnesium oxide are parts of the mixture, and particle size is limited. However, this reference does not teach the use of thermochemical fluids.

Each of the aforementioned references suffers from one or more drawbacks hindering their adoption. None of the references discloses accelerating the process of sand consolidation for subterranean geologic formations. Accordingly, it is one object of the present disclosure to provide a method for sand consolidation using a chemical mixture to generate heat to accelerate and thereby shorten the duration of the treatment for consolidating sand material.

SUMMARY

In an exemplary embodiment, a method for consolidating a subterranean geologic formation is provided. The method includes injecting a first composition, a second composition, and a third composition into the subterranean geologic formation. The first composition includes CaO, the second composition includes MgO, and the third composition includes $NH_4HF_2$. The method includes injecting at least one thermochemical fluid into the subterranean geologic formation to raise a temperature of the subterranean geologic formation to at least 120° C. The method includes reacting the third composition respectively with the first composition and the second composition to form $CaF_2$ and $MgF_2$ in the subterranean geologic formation. The method includes precipitating the $CaF_2$ and the $MgF_2$ on sand grains of the subterranean geologic formation to bind the sand grains together into a consolidated matrix in the subterranean geologic formation.

In some embodiments, injecting at least one thermochemical fluid includes injecting at least one selected from the group consisting of $MgCl_2 \cdot 6H_2O$, $CaCl_2 \cdot 2H_2O$, $NaNO_2$, and $NH_4Cl$.

In some embodiments, injecting at least one thermochemical fluid includes injecting $NaNO_2$ and $NH_4Cl$.

In some embodiments, the method further includes injecting an acidic activator that is configured to activate an exothermal reaction between the $NaNO_2$ and the $NH_4Cl$.

In some embodiments, the $NaNO_2$ and the $NH_4Cl$ are injected into the subterranean geologic formation to form a mixture therein. The acidic activator is then injected into the mixture.

In some embodiments, the $NaNO_2$ and the $NH_4Cl$ are injected into the subterranean geologic formation in batches to form batches of mixtures. The acidic activator is injected into each batch of mixtures.

In some embodiments, the $NaNO_2$ and the $NH_4Cl$ are injected separately into the subterranean geologic formation.

In some embodiments, the acidic activator is pre-mixed with one of the $NaNO_2$ and the $NH_4Cl$ before injecting into the subterranean geologic formation.

In some embodiments, the acidic activator includes acetic acid.

In some embodiments, the acidic activator has a concentration of 7-13% by volume of a total volume of the $NaNO_2$ and the $NH_4Cl$.

In some embodiments, the $NH_4Cl$ has a concentration of 2-4 moles per liter (mol/L). The $NaNO_2$ has a concentration of 2-4 mol/L.

In some embodiments, the at least one thermochemical fluid is injected into the subterranean geologic formation to raise the temperature of the subterranean geologic formation to 120-180° C.

In some embodiments, the at least one thermochemical fluid is injected continuously or in batches into the subterranean geologic formation to raise and maintain the temperature of the subterranean geologic formation to 120-180° C. for 4-10 hours.

In some embodiments, injecting the first composition, the second composition and the third composition and injecting the at least one thermochemical fluid are executed alternately in batches.

In some embodiments, the first composition includes the CaO and water, the second composition includes the MgO and water, and the third composition includes the $NH_4HF_2$ and water.

In some embodiments, the sand grains of the subterranean geologic formation have an average particle size of less than 0.6 millimeters (mm) before the first composition, the second composition and the third composition are injected into the subterranean geologic formation.

In some embodiments, the consolidated matrix includes 40-50% quartz, 35-45% calcite, and 5-15% anorthoclase.

In some embodiments, soaking the consolidated matrix in toluene for 24 hours, draining then drying reduces a weight of the consolidated matrix by less than 5%.

In some embodiments, soaking the consolidated matrix in water for 24 hours, draining then drying reduces a weight of the consolidated matrix by less than 2%.

In some embodiments, soaking the consolidated matrix in 15 wt. % HCl for 24 hours, draining then drying reduces a weight of the consolidated matrix by 40-50%.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
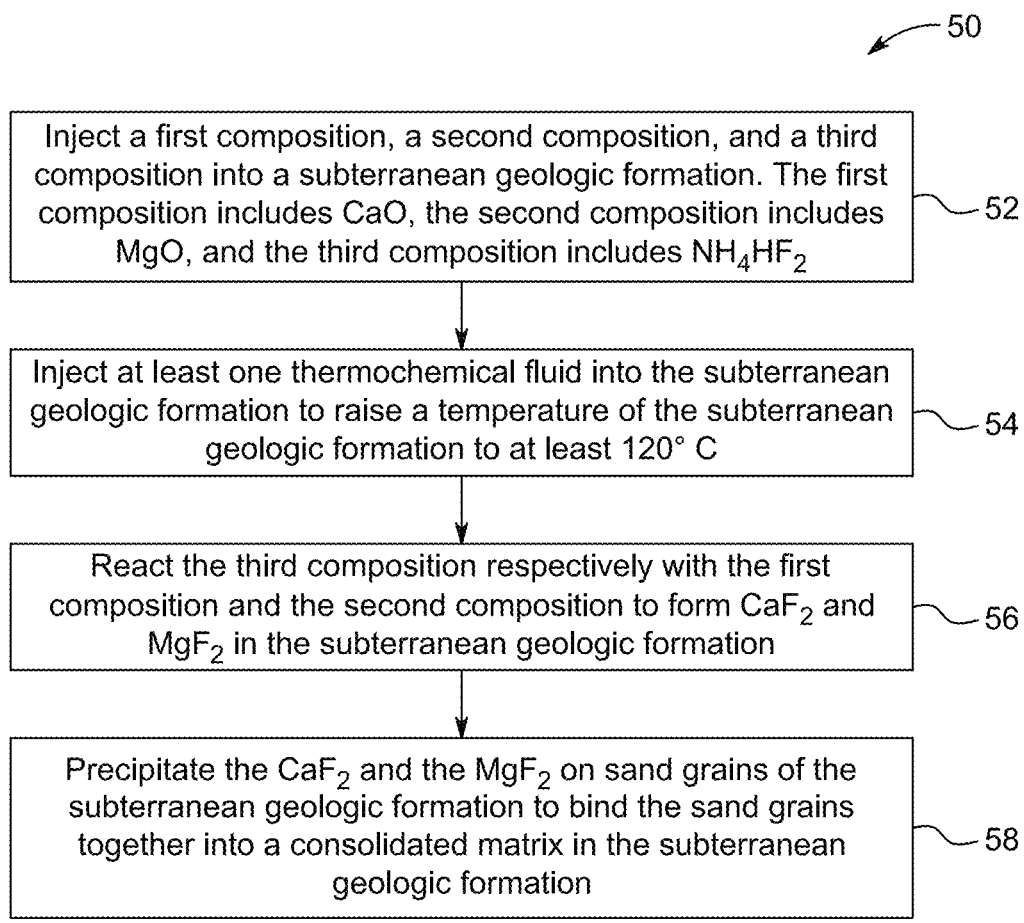
FIG. 1 is a schematic diagram of a method flow chart for consolidating a subterranean geologic formation, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As disclosed herein, in situ sand consolidation can be used for effective performance in preventing sand production. Chemical solutions are injected to interact with the target formation and improve its strength. Low-temperature oxidization (LTO) is one of the in-situ sand consolidation approaches that involves the injection of asphaltene-rich fluids to induce a coke-like residue and prevent sand production. The LTO technique is usually applied at temperatures less than 315° F. However, an external heating source is required to increase the temperature and activate the interactions between the injected chemicals and the formation matrix. The LTO approach was improved by introducing an exothermic reaction before injecting asphaltene-rich fluids. Thermochemical fluids were used to increase the formation temperature and improve the LTO performance. The injected chemicals increased the temperature from 75 to around 190° C. and improved the formation strength against different chemical treatments such as toluene or acid. Also, it was reported that the improved LTO technique could reduce the treatment time and cost by incorporating thermochemical fluids.

Aspects of the present disclosure are directed to a method of sand consolidation. The present disclosure provides an improved form of a sand-control technique for treating poorly consolidated, subterranean geologic formations. Accordingly, an objective of the present disclosure is to accelerate the sand consolidation treatment in order to shorten implementation time and reduce cost. The disclosed method focuses on minimizing sand production by improving the strength of sandstone formation by utilizing for example enforced calcium and magnesium precipitation.

The method includes injecting three reactant fluids into a subsurface formation. The injected chemicals react at the subsurface conditions and induce calcium and magnesium fluoride precipitations. The precipitated compounds act as cementing materials and improve the bonding between the sand particles.

Consolidated sand samples were soaked in different fluids, and the changes in the rock properties were evaluated. The porosity system, rock mineralogy, and core strength were measured at different stages. The method of the present disclosure can significantly improve sand consolidation and increase rock strength to 34 mega pascals (MPa). The consolidated sand samples prepared using the proposed method can withstand different treatments, such as water and toluene injections. Soaking the consolidated sand samples in water and toluene showed minor alterations in the rock properties. The reduction in the strength of the consolidated sand samples due to water and toluene treatments is less than 10%, preferably less than 8%, preferably less than 5%. Hence, the present sand consolidation treatment can significantly improve rock strength by utilizing the enforced calcium and magnesium precipitation.

As used herein, the term 'permeability' refers to the property of a porous material (such as a rock or an unconsolidated material) to allow a fluid (gas or liquid) to pass through. Permeability can be related to the porosity of the porous material, the shape of the porous material, pressure inside the porous material, etc. Permeability can be measured in various ways, for example, by determining a related mathematical value, such as filtration coefficient, hydraulic conductivity, solute permeability coefficient, or osmotic reflection coefficient. Permeability measurements can be performed based on Darcy's Law, as shown in Permeability Measurement Methods in Porous Media: A Review (ASME IMECE 2008; Boston, MA; DVD Proceedings; paper IMECE2008-68543). Permeability of the subsurface formation is reduced by less than 20%, preferably less than 15%, preferably less than 10%, preferably less than 5%, after precipitating $CaF_2$ and $MgF_2$ to form a consolidated matrix in the subsurface formation. It should be noted that techniques herein may target poorly consolidated natural formations that typically show large permeabilities. Therefore, the said reduction in the permeability of the subsurface formation caused by the consolidation treatment is usually insignificant and the retained permeability is considered excellent by normal standards.

According to an aspect of the present disclosure, a method for consolidating a subterranean geologic formation is described. The subterranean geological formation may include, but is not limited to, a subterranean oil and/or gas reservoir, a depleted oil reservoir, a depleted gas reservoir, a sour reservoir, a hydrocarbon bearing subterranean formation, a saline formation, or an un-minable coal bed. A subterranean geologic formation in which an oil and/or gas reservoir is present may include a wellbore with a surface opening. The wellbore may be formed in the subterranean geologic formation by known techniques. The wellbore may be drilled in the subterranean geologic formation to aid in the exploration and extraction of a formation fluid (also known as 'naturally present formation fluids') from the subterranean geologic formation. The formation fluid may include water, crude oil, gas, or a combination thereof. In other words, the subterranean geologic formation may be processed to produce water, crude oil, gas, or a mixture of these fluids. For extraction of the formation fluid, the wellbore may be provided with multiple perforations. These perforations may be in the form of a hole (openings) formed in a casing or liner of the wellbore to create channels for allowing flow of the formation fluid from the subterranean geologic formation into the wellbore. The perforations may be formed uniformly or non-uniformly along a length of the wellbore without any limitations.

The subterranean geologic formation may include carbonate minerals. These carbonate minerals may include, for example, calcite and dolomite in their mineral composition. The subterranean geologic formation with the carbonate minerals may generally have unconsolidated (weak) sandstone formation, which in turn hampers the extraction of the formation fluid from the subterranean geologic formation due to sand production phenomenon. Sand production may cause migration of sand grains and fine particles from a subsurface, poorly consolidated formation into the wellbore and further to the surface while extracting the formation fluid from the subterranean geologic formation (if sand consolidation is not performed). Excessive or uncontrolled sand production may erode subsurface equipment, wear surface production facilities, increase production cost, cause sudden choking of wells and create down-hole cavities leading to closure of an entire field. For preventing sand production, sand particles in a region surrounding the wellbore may need to be consolidated.

To prevent sand production, sand particles (e.g., carbonate minerals) in a region surrounding a wellbore may need to be consolidated. It has been found that there is a need to consolidate the sand particles in a region extending radially from the wellbore to the subterranean geologic formation by about a few feet. Such a region can be referred to as a "target region" for purposes of the present disclosure. In an example, the target region extends radially from the wellbore to the subterranean geologic formation by up to about 4 feet, preferably up to about 3 feet, up to about 2 feet, preferably 1-2 feet or 3-4 feet. It may be contemplated that the target region may be defined to be narrower or wider depending on the subterranean geologic formation, or specifically geographical location of the subterranean geologic formation; for example, regions such as U.S Gulf Coast, North Sea, China, Canada, Venezuela, Western Africa, Indonesia, Malaysia and the like which prominently face the sand production issue may generally, but not necessarily, require wider target regions.

Injection pressure and injection flow rate may also vary, depending on the subterranean geologic formation. For example, thermochemical fluids, such as ammonium chloride and sodium nitrite, can be injected. The injection flow rate of ammonium chloride is preferably 80-120 gallons per minute, more preferably 90-110 gallons per minute, preferably about 100 gallons per minute. The injection flow rate of sodium nitrite is preferably 80-120 gallons per minute, more preferably 90-110 gallons per minute, preferably about 100 gallons per minute. The acetic acid is pre-mixed with one of the ammonium chloride and the sodium nitrite. The injection pressure of the ammonium chloride and the sodium nitrite can be adjusted to satisfy the injection flow rates depending on pressure and permeability of the subterranean geologic formation. Note that a bottom-hole injection pressure should not exceed a fracture pressure of the subterranean geologic formation and is preferably no greater than 90% of the fracture pressure, more preferably no greater than 85%, 80% or 75% of the fracture pressure of the subterranean geologic formation.

In an aspect of the present disclosure, the period for injecting the at least one thermochemical fluid is about 6-10 hours, preferably 6-9 hours or 7-10 hours, preferably 6-8 or 7-9 hours, (in contrast to 24-72 hours for existing techniques). Herein, the at least one thermochemical fluid is injected continuously or in batches into the subterranean geologic formation to raise and maintain the temperature of the subterranean geologic formation to 120-180° C. for 4-10 hours. Such a time period may ensure sufficient precipitation of $CaF_2$ and $MgF_2$ to form a consolidated matrix in the subsurface geologic formation with permeability reduced by less than 20%, which may be required for achieving the objective of preventing sand production in the subterranean geologic formation. The achieved consolidated permeable matrix acts as the barrier to restrain the movement of the sand and/or other solid grains during fluid production from the subterranean geologic formation.

FIG. 1 illustrates a flow chart of a method 50 for consolidating a subterranean geologic formation. The method 50 may pertain to a sand control technique which involves consolidating sand particles into a solid permeable matrix to restrain the movement of the sand grains detached during hydrocarbon and/or water production. The present method 50 may shorten the duration of the consolidation treatment by generating heat in situ to accelerate the process and deposit more consolidating material, thus, increasing its quality and cost-effectiveness. The present method 50 may provide production enhancement from subsurface hydrocarbon or water reservoirs. The present method 50 may further allow control of the sand production and allow other solid particles within the wells to penetrate poorly consolidated, subterranean formations by sand consolidation to form a region of a solid sand matrix surrounding the wellbore which acts as a barrier to restrain the movement of the sand grains while the formation fluid from the subterranean geologic formation may be extracted. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a first composition, a second composition, and a third composition into the subterranean geologic formation. In an embodiment, the first composition, the second composition, and the third composition may be injected into the subterranean geologic formation through the surface opening of the wellbore. In some embodiments, the first composition includes CaO, the second composition includes MgO, and the third composition includes $NH_4HF_2$. In some embodiments, the first composition includes the CaO and water, the second composition includes the MgO and water, and the third composition includes the $NH_4HF_2$ and water.

In some embodiments, prior to injecting the first composition, the second composition, and the third composition into the subterranean geologic formation, the method 50 may further include flushing regions of the wellbore with a solvent to at least partially remove the formation fluid from the regions. The solvent may be a chemical additive that is soluble in oil, water, and acid-based treatment fluids. The solvent may be miscible with both aqueous and oleaginous fluids. Thereby, the use of the solvent, prior to injecting the first composition, the second composition, and the third composition, may help dissolve the formation fluid. In some examples, the solvent may also help with controlling the wettability of contact surfaces before, during, or after a treatment, and may also help in preventing or breaking emulsions. A commonly used solvent is ethylene-glycol-mono-butyl ether, also known as EGMBE. Other organic solvents such as diesel and/or toluene may be used. Alternately water may be used.

At step 54, the method 50 includes injecting at least one thermochemical fluid into the subterranean geologic formation to raise a temperature of the subterranean geologic formation to at least 120° C. The thermochemical fluid is used to generate heat energy into the subterranean geologic formation such that the portion of the subterranean geologic formation in the regions is heated to the target temperature of at least 120° C. In some embodiments, the at least one thermochemical fluid is injected into the subterranean geologic formation to raise the temperature of the subterranean geologic formation to about 120° C., about 130° C., about 140° C., about 150° C., about 160° C., or about 170° C. In some embodiments, at least one thermochemical fluid is injected into the subterranean geologic formation to raise the temperature of the subterranean geologic formation up to about 180° C. The thermochemical fluid is selected to generate heat energy released from an exothermic chemical reaction. The thermochemical fluid may dilute the first composition, the second composition, and the third composition in the regions of the wellbore. Such generated heat may raise the temperature of the regions to levels much higher than the natural temperature of the subterranean geologic formation. Moreover, the thermochemical fluid may reduce the saturation of the first composition, the second composition, and the third composition in the regions to low levels, which may ensure high retention of the permeability of the regions after the treatment.

In some examples, the thermochemical fluid may include one or more redox reactants that exothermically react to generate heat energy. Suitable redox reactants include urea, sodium hypochlorite, ammonium-containing compounds, and nitrite-containing compounds. In some embodiments, injecting at least one thermochemical fluid includes injecting at least one selected from the group consisting of $MgCl_2 \cdot 6H_2O$, $CaCl_2 \cdot 2H_2O$, $NaNO_2$ and $NH_4Cl$. In the present examples, the thermochemical fluid includes ammonium and nitrite (e.g. $NaNO_2$ and $NH_4Cl$). That is, the thermochemical fluid includes at least one ammonium-containing compound and at least one nitrite-containing compound. In one or more aspects of the present disclosure, the ammonium includes ammonium chloride ($NH_4Cl$) and the nitrite includes sodium nitrite ($NaNO_2$). Injecting the at least one thermochemical fluid includes injecting $NaNO_2$ and $NH_4Cl$. In other examples, the ammonium containing compound may include chemicals like ammonium bromide, ammonium nitrate, ammonium sulfate, ammonium carbonate, and ammonium hydroxide; and the nitrite-containing compound may include a chemical like potassium nitrite, without departing from the spirit and the scope of the present disclosure.

It may be contemplated by a person skilled in the art that in the case of the thermochemical fluid, including the ammonium chloride and the sodium nitrite, the exothermic reaction for generating heat energy therefrom may need to be triggered. For such a purpose, the pH level of the thermochemical fluid may need to be reduced to below 5, preferably below 4, preferably 1-3. In some embodiments, the method 50 further includes injecting an acidic activator that is configured to activate an exothermal reaction between the $NaNO_2$ and the $NH_4Cl$, whereby the temperature of the subterranean geologic formation rises due to the in-situ generated heat. The $NaNO_2$ and the $NH_4Cl$ are injected into the subterranean geologic formation to form a mixture therein. The acidic activator is then injected into the mixture. In some embodiments, the acidic activator is pre-mixed with one of the $NaNO_2$ and the $NH_4Cl$ before injecting into the subterranean geologic formation. The acidic activator may be used to trigger the exothermic reaction by reducing the pH of the medium to below 4. The acidic activator may include an acid or a combination of acids. The acid may include at least one acid selected from the group consisting of formic acid, HCl, sulfuric acid, acetic acid, and palergonic acid. In some embodiments, the acidic activator includes acetic acid. The acetic acid acts as a hydrogen-releasing activator to trigger the exothermic reaction between the $NaNO_2$ and the $NH_4Cl$. In some embodiments, the acidic activator has a concentration of about 7%, about 8%, about 9%, about 10%, about 11%, and about 12% by volume of the total volume of the $NaNO_2$ and the $NH_4Cl$. In some embodiments, the acidic activator has a concentration up to about 13%, preferably 8-12%, preferably 9-11%, by volume of the total volume of the $NaNO_2$ and the $NH_4Cl$. In some embodiments, the $NH_4Cl$ has a concentration of about 2 moles per liter (mol/L), about 3 mol/L. In some embodiments, the NHCl has a concentration up to about 4 mol/L, more preferably 2.5-3.5 mol/L. The $NaNO_2$ has a concentration of about 2 mol/L, about 3 mol/L. In some embodiments, the $NaNO_2$ has a concentration up to about 4 mol/L, more preferably 2.5-3.5 mol/L.

The $NaNO_2$ and the $NH_4Cl$ can be injected into the subterranean geologic formation in batches to form batches of mixtures via the wellbore. The volume of each batch can be approximately equal to a pore volume of the region to be treated. Herein, the pore volume refers to the total volume of very small openings in the subterranean geologic formation. Following each batch of the thermochemical mixture, a respective batch of the acidic activator is injected into each batch of mixtures to initiate the exothermic reaction within the regions. A short pause can be applied between injections of the thermochemical fluid batches to allow the exothermic reaction to complete and the regions to absorb the generated heat therefrom.

In some embodiments, injecting the first composition, the second composition, and the third composition and injecting at least one thermochemical fluid is executed alternately in batches. In some embodiments, the $NaNO_2$ and the $NH_4Cl$ are injected separately into the subterranean geologic formation. In some embodiments, at least one thermochemical fluid is injected continuously or in batches into the subterranean geologic formation to raise and maintain the temperature of the subterranean geologic formation to 120° C., about 130° C., about 140° C., about 150° C., about 160° C., about 170° C. or about 180° C. for about 4 hours, 5 hours, 6 hours, 7 hours, 8 hours, or 9 hours. In some embodiments, at least one thermochemical fluid is injected continuously or in batches into the subterranean geologic formation to raise and maintain the temperature of the subterranean geologic formation up to about 180° C. for 10 hours.

In an aspect of the present disclosure, the ammonium and the nitrite are injected separately into the subterranean geologic formation. Such separate injections of the thermochemical fluid into the subterranean geologic formation are done to ensure that a first direct contact therebetween is in the regions, and thereby avoid premature reaction therebetween, which would otherwise have dissipated the generated heat from a consequent exothermic reaction and, and thus may have reduced the efficiency of the heating process for the regions. In an aspect, the acidic activator is pre-mixed with one of the ammoniums and the nitrites before being injected into the subterranean geologic formation. For example, the acidic activator is pre-mixed with one of the thermochemical fluids before being injected into the subterranean geologic formation, such that when the other one of the thermochemical fluids is injected into the subterranean geologic formation, the reaction between the thermochemical fluid may be initiated.

At step 56, the method 50 includes reacting the third composition respectively with the first composition and the second composition to form $CaF_2$ and $MgF_2$ in the subterranean geologic formation.

At step 58, the method 50 includes precipitating the $CaF_2$ and the $MgF_2$ on sand grains of the subterranean geologic formation to bind the sand grains together into a consolidated matrix in the subterranean geologic formation. In some embodiments, the sand grains of the subterranean geologic formation have an average particle size of less than 0.6 millimeters (mm), more preferably between 0.1 and 0.4 mm with an average size of 0.28 mm, before the first composition, the second composition and the third composition are injected into the subterranean geologic formation. In some embodiments, the consolidated matrix includes about 40%, about 41%, about 42%, about 43%, about 44%, about 45%, about 46%, about 47%, about 48%, about 49% quartz; about 35%, about 36%, about 37%, about 38%, about 39%, about 40%, about 41%, about 42%, about 43%, about 44% calcite; and about 5%, about 6%, about 7%, about 8%, about 9%, about 10%, about 11%, about 12%, about 13%, about 14% anorthoclase. In some embodiments, the consolidated matrix includes up to about 50% quartz, 45% calcite, and 15% anorthoclase, more preferably 43% quartz, 39% calcite, and 8.2% anorthoclase. In some embodiments, soaking the consolidated matrix in toluene for 24 hours, draining then drying reduces a weight of the consolidated matrix by less than 5%, preferably less than 3%, preferably less than 2%. In some embodiments, soaking the consolidated matrix in 15 wt. % HCl for 24 hours, draining then drying reduces the weight of the consolidated matrix by about 40%, about 41%, about 42%, about 43%, about 44%, about 45%, about 46%, about 47%, about 48%, about 49%, or about 50%.

EXAMPLES

The following examples describe and demonstrate exemplary embodiments of the method 50 for consolidating a subterranean geologic formation described herein. The examples are provided solely for the purpose of illustration and are not to be construed as limitations of the present disclosure, as many variations thereof are possible without departing from the spirit and scope of the present disclosure.

In the present disclosure, unconsolidated sand was treated using chemical solutions to increase the consolidation characteristics. Ammonium hydrogen fluoride ($NH_4HF_2$) was used along with calcium oxide and magnesium oxide solutions at high temperatures generated using thermochemical fluids (sodium nitrate and ammonium chloride). Sand particles were soaked with the solutions until the consolidation took place. The temperature generated by the thermochemical was above 120° C. The following reactions took place to precipitate calcium and magnesium fluorides:

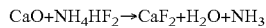

$$CaO + NH_4HF_2 \rightarrow CaF_2 + H_2O + NH_3$$

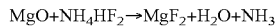

$$MgO + NH_4HF_2 \rightarrow MgF_2 + H_2O + NH_3$$

Different characterization techniques were used, including X-ray diffraction analysis (XRD), nuclear magnetic resonance (NMR), scratch measurements, and scanning electron microscopy (SEM) analysis. Also, different treatments were applied to examine their impact on the rock properties. The consolidated samples were immersed in water, toluene, and HCl, then the changes in the petrophysical properties were evaluated. NMR measurements were conducted using water-saturated samples under the same conditions, which could reduce the uncertainty of the measurements. Scratch experiments were carried out to determine the compressive strength of the consolidated sand pack after each chemical treatment. The measurements were conducted at ambient conditions using different values of cutting depth, and then the average strength values were determined. Moreover, SEM was used to examine the samples to obtain the topography of each sample using a secondary electron detector (SE), and the chemical composition was evaluated using energy dispersive spectroscopy (EDS).

Figure 2:
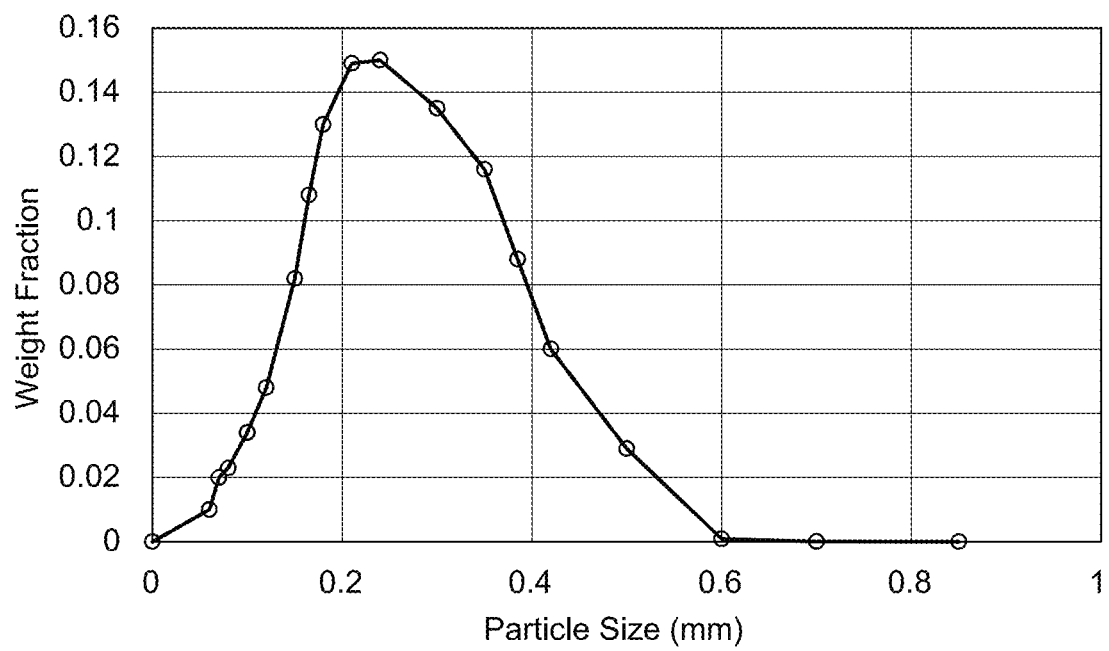
FIG. 2 depicts particle size distribution for sand used in the present disclosure, according to certain embodiments.
Figure 3:
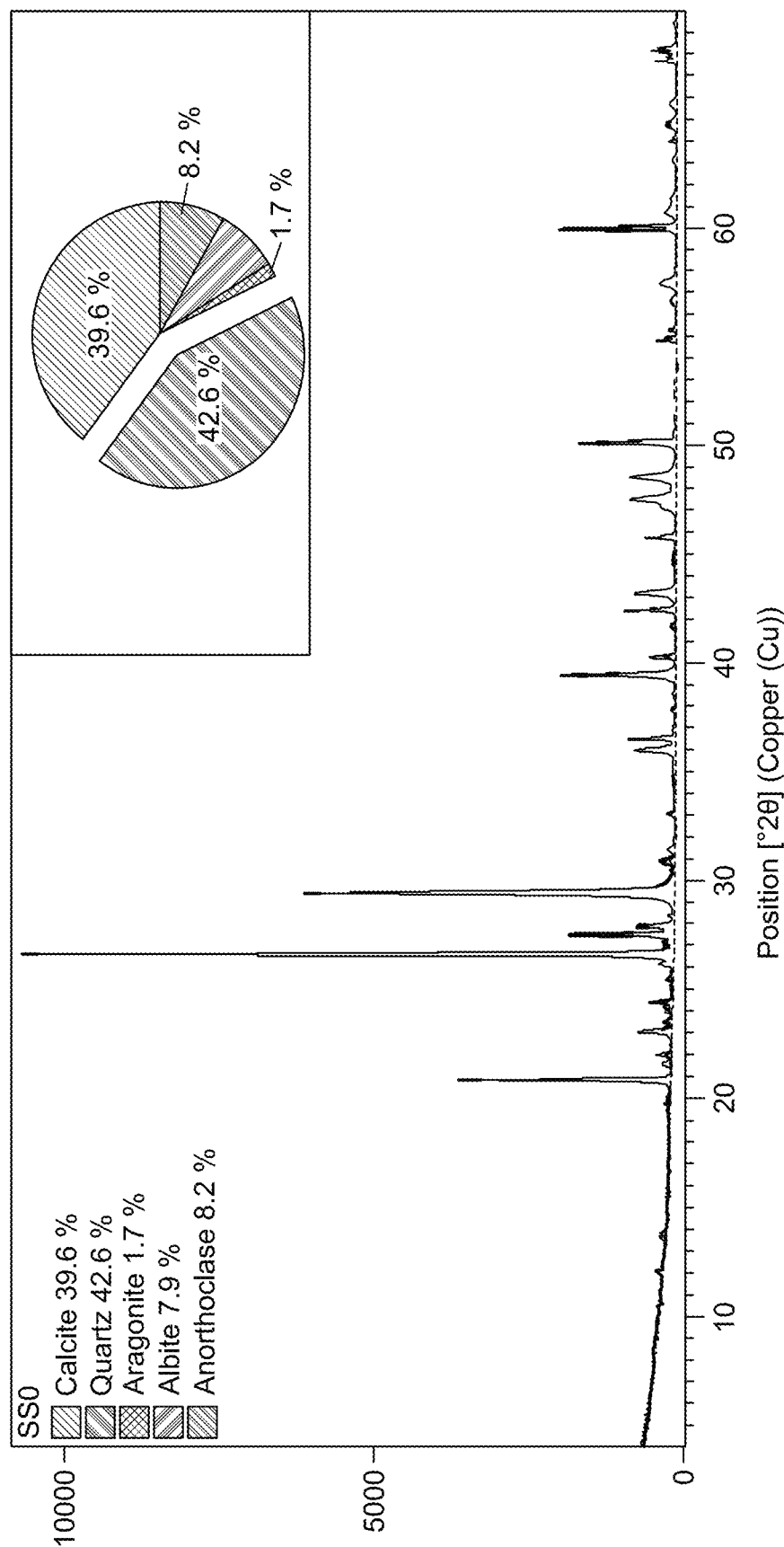
FIG. 3 depicts X-ray diffraction analysis (XRD) results for the consolidated sand sample after consolidating using the enforced calcium precipitation, according to certain embodiments.
Figure 4:
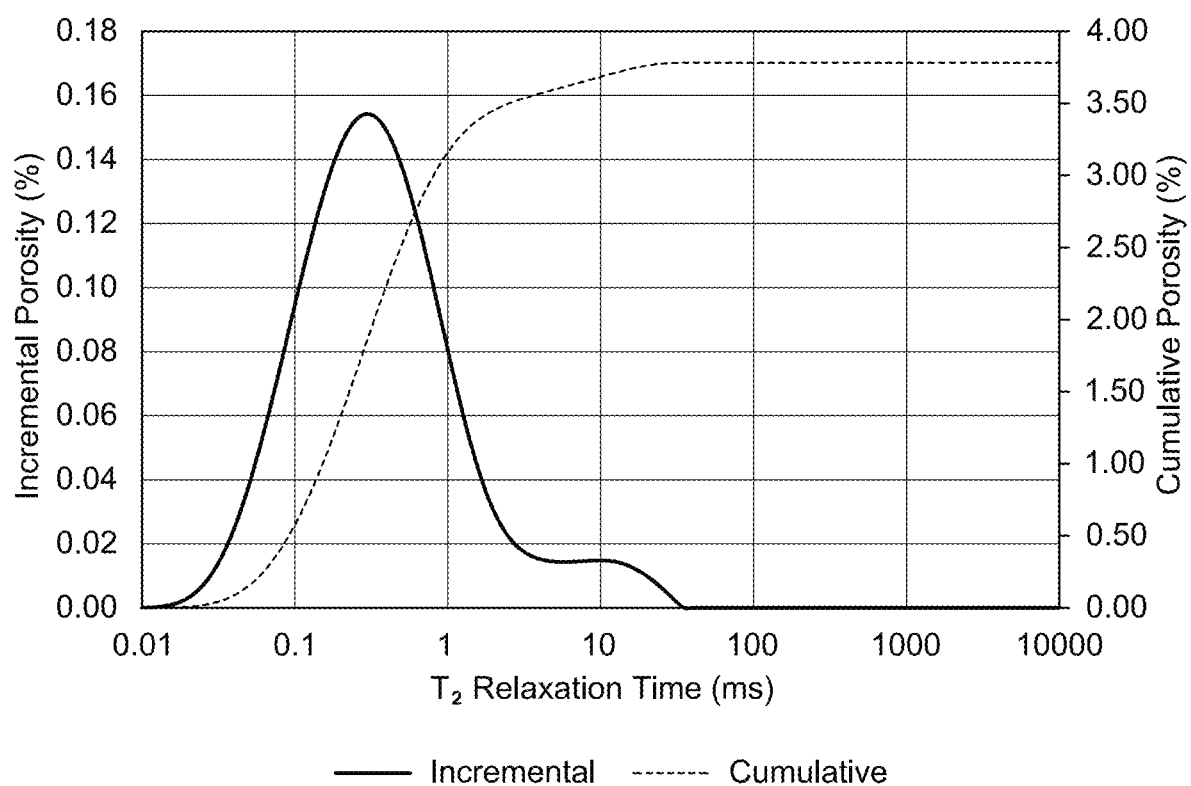
FIG. 4 depicts profiles of the incremental and cumulative porosity for a consolidated sand sample, before water saturation, according to certain embodiments.

FIG. 2 shows the particle size distribution for the loose sand used in this work; the sand size varies between 0.1 and 0.4 mm, with an average size of 0.28 mm. The loose sand was used to prepare the consolidated sand pack. FIG. 3 shows the XRD results for the consolidated sand sample before any treatment. Loose sand was used, and chemical solutions were utilized to consolidate the sands based on the enforced calcium precipitations. The sample showed around 43% quartz, 39% calcite, and 8.2% Feldspar (Anorthoclase). The high percentage of calcite comes from the enforced calcium precipitation, while the quartz and feldspar percentages represent the common components of the loose sand. Moreover, the profiles of the incremental and cumulative porosity for the consolidated sand are shown in FIG. 4. The sample showed a homogeneous and connected pore system, where a single T2 peak was observed at 0.22 milliseconds (ms). The NMR results presented in FIG. 4 are for the consolidated sand before performing any water saturation. Hence, the NMR signal is due to moisture water. Also, a cumulative porosity of 3.78% was achieved, representing the total moisture volume. The cumulative porosity does not represent the sample's total porosity, since the sample is dry. The results of saturating the consolidated sand sample with water indicate the total sample porosity. The impact of toluene and HCl treatments on the porosity system and rock mineralogy is also discussed.

Figure 5:
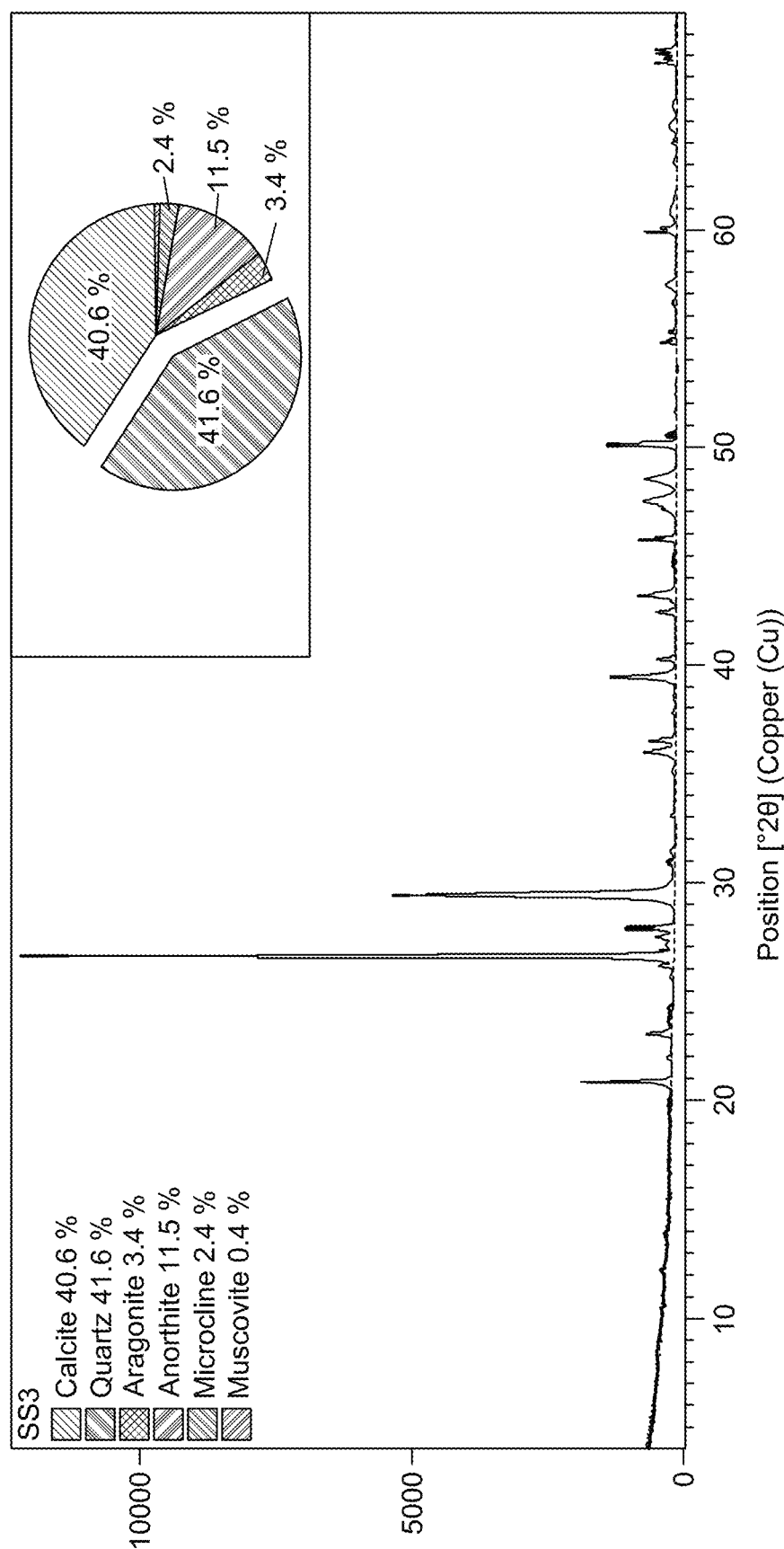
FIG. 5 depicts a mineralogical composition of the consolidated sand sample after water treatment, according to certain embodiments.
Figure 6:
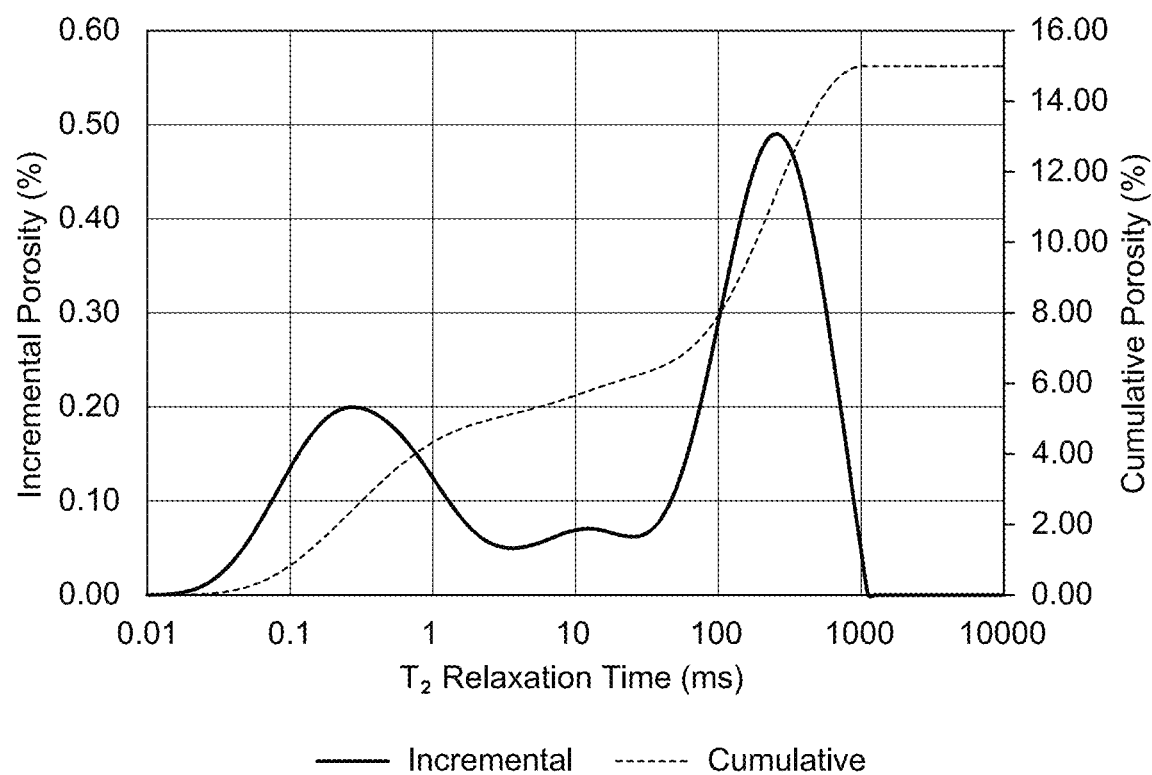
FIG. 6 depicts nuclear magnetic resonance (NMR) results for the consolidated sand sample, after saturating the sample with water, according to certain embodiments.
Figure 7A:
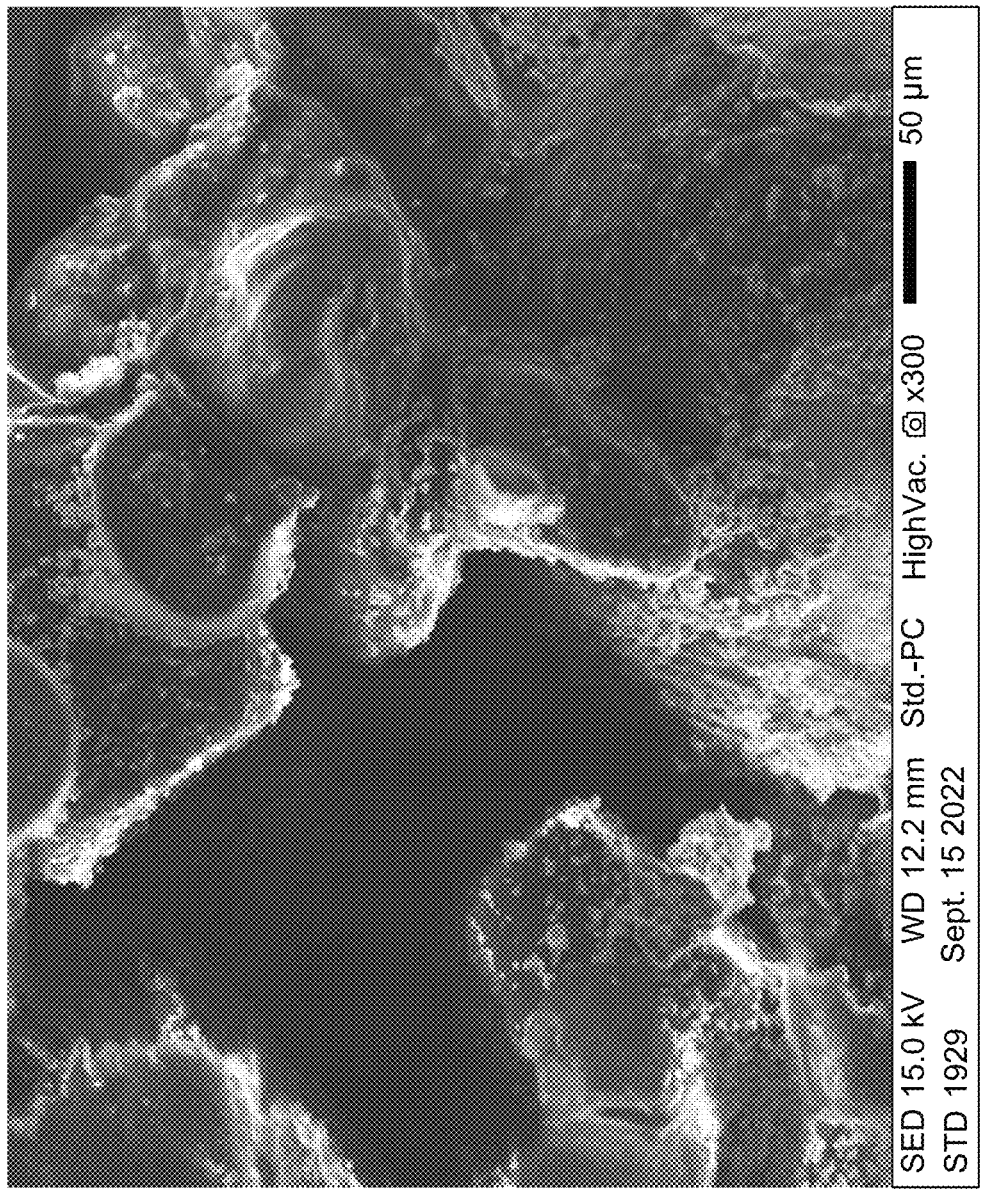
FIG. 7A-FIG. 7B depict scanning electron microscope (SEM) images for the consolidated sand sample before water treatment, at 50 and 500 micrometers (μm), respectively, according to certain embodiments.
Figure 7B:
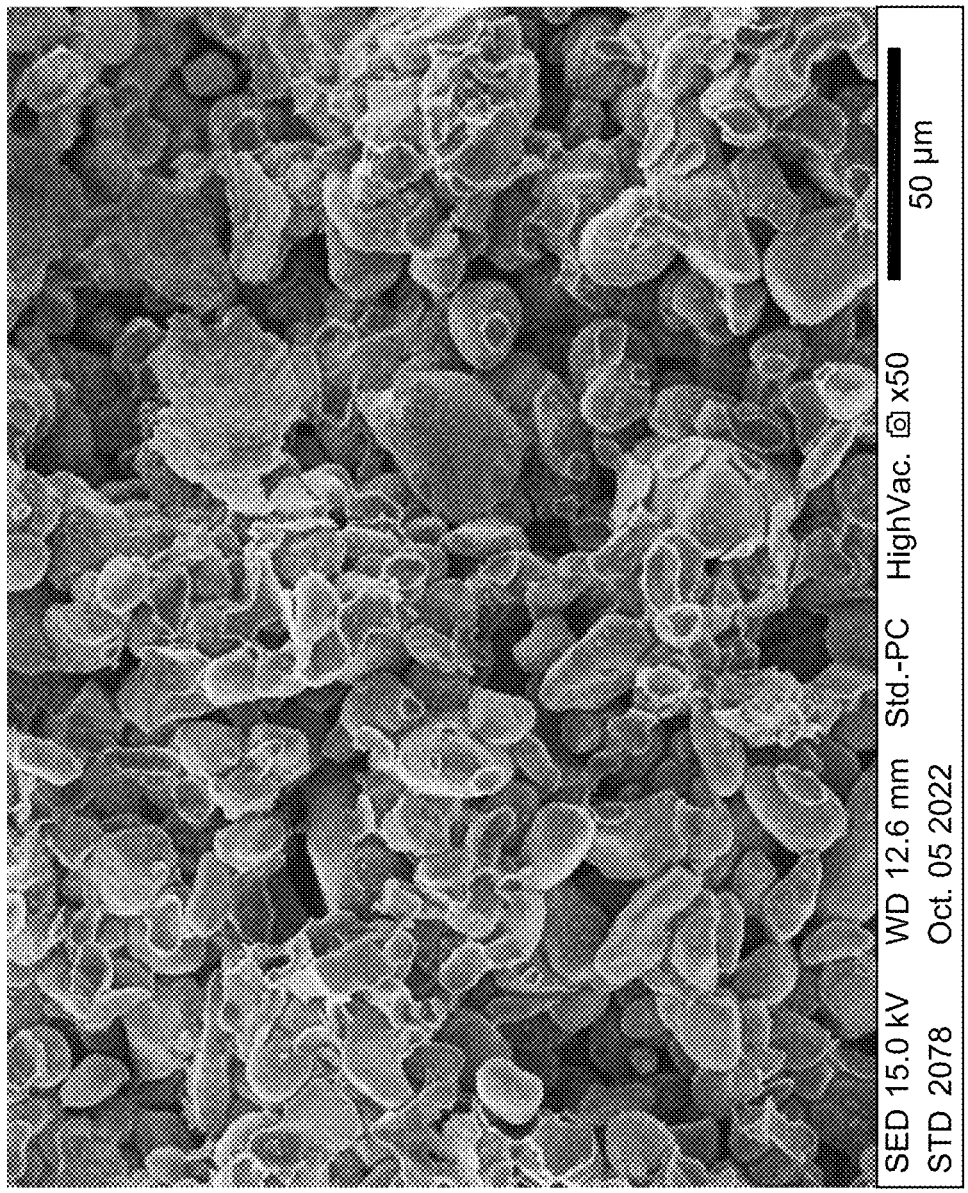
Figure 7C:
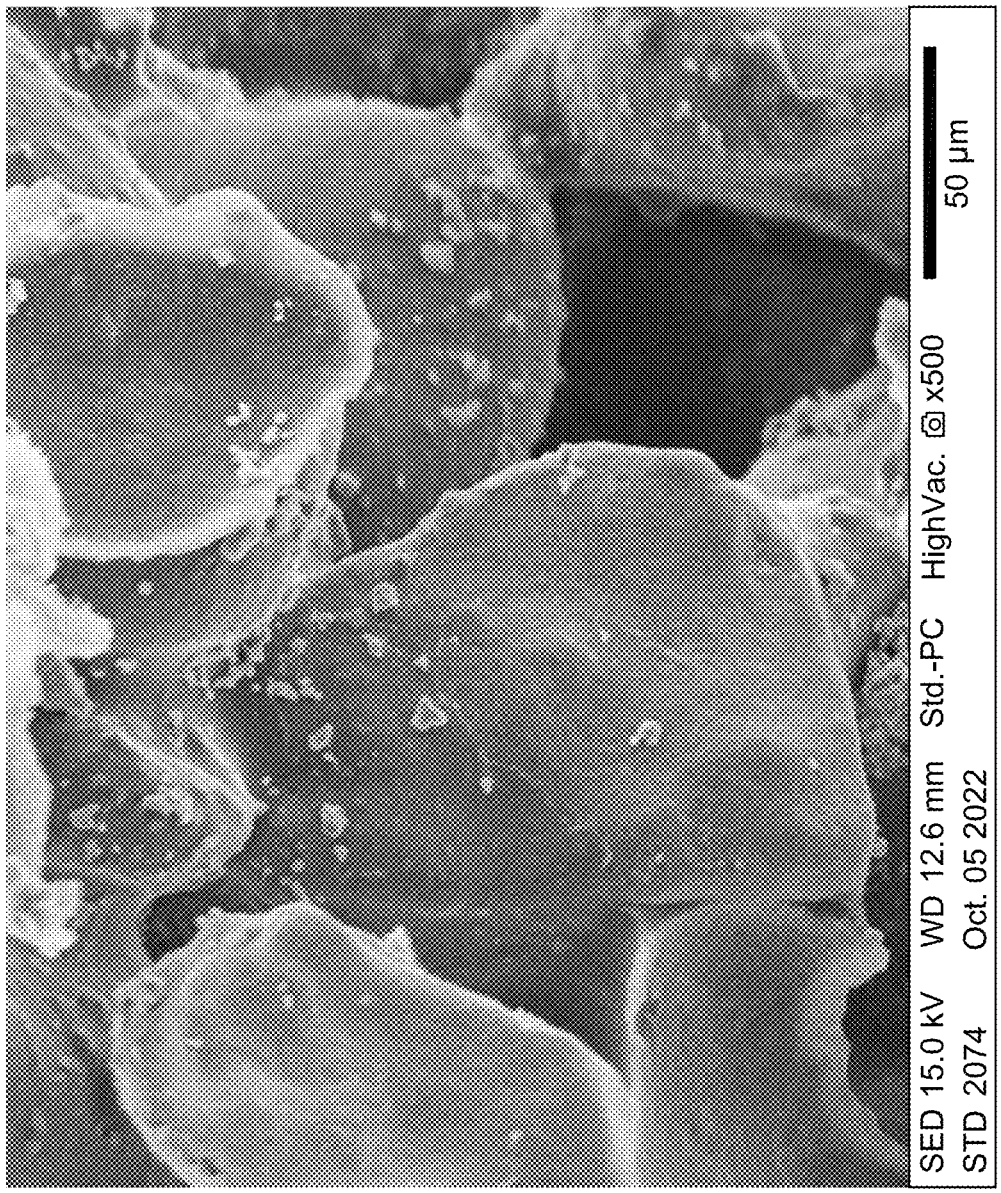
FIG. 7C-FIG. 7D depict SEM images for the consolidated sand sample after water treatment, at 50 and 500 μm, respectively, according to certain embodiments.
Figure 7D:
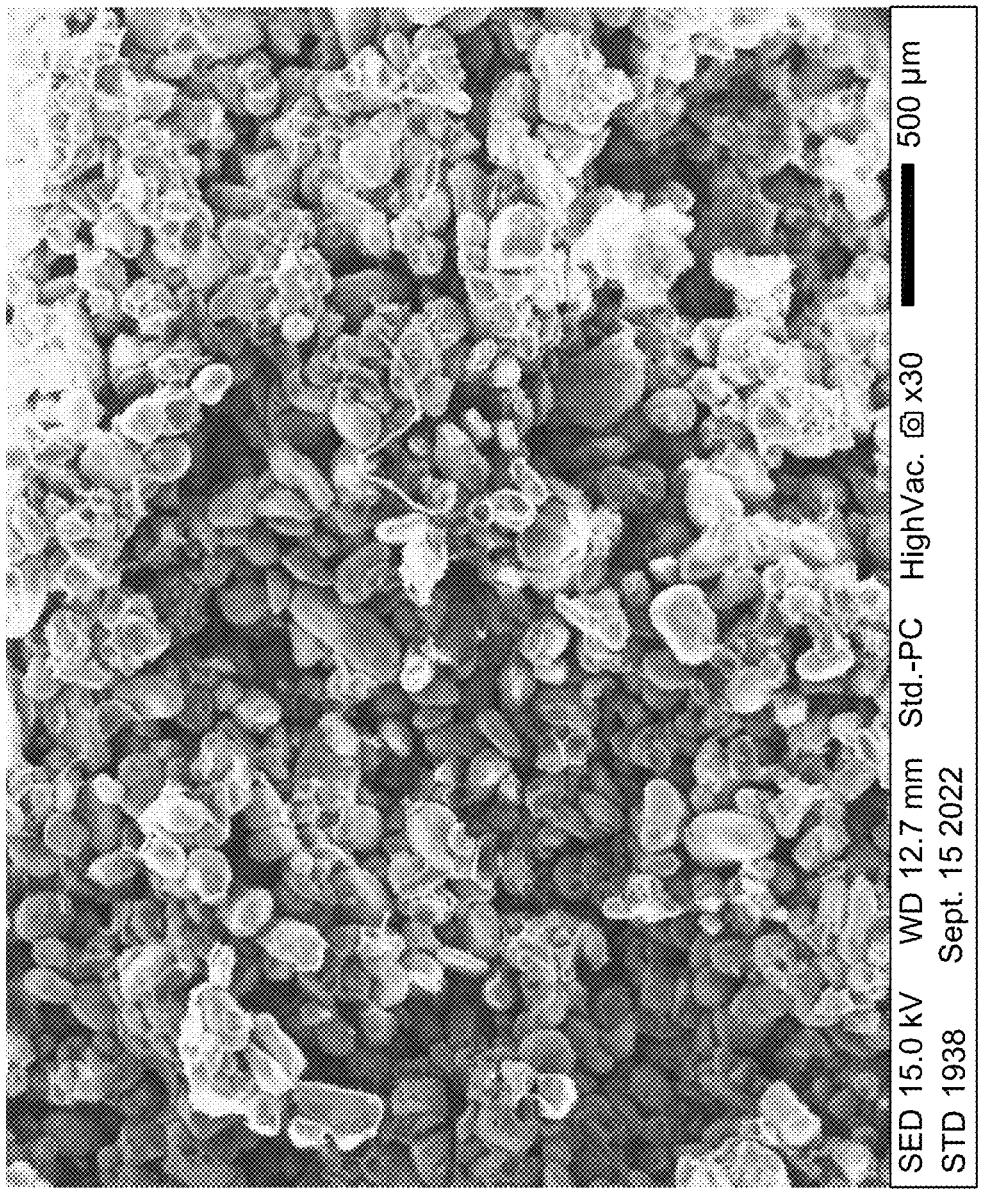

The prepared sand sample was soaked in water for 24 hours, and then the rock composition was examined using XRD analysis. The mineralogical composition of the consolidated sand sample after water treatment is shown in FIG. 5. The water treatment did not affect the rock composition, where 40% calcite and 41% quartz were observed. The percentage of the calcite minerals in the sand sample after water treatment indicates no calcite dissolution. Meanwhile, SEM analysis can provide observations about the morphological change induced by the water treatment or the lack thereof, where microscopic images will be obtained before and after the water treatment. Moreover, the NMR results for the consolidated sand sample, after saturating the sample with water, are provided in FIG. 6. Two T2 peaks (at 0.2 and 220 ms) respectively correspond to the moisture and saturated water responses. Also, a cumulative rock porosity of 15% was observed.

In addition, FIGS. 7A-7D show the SEM images for the sand sample before and after treatment with fresh water. Two SEM resolutions (50 and 500 micrometers (μm)) were used to probe the sand/water interactions. Soaking the consolidated sand in water led to a minor dissolution, as indicated by the 50 μm SEM images. The small particles disappeared from the grain surfaces after treatment with water. However, the 500 μm SEM images show almost the same sand structure. Furthermore, the interaction between the consolidated sand and water was studied utilizing the inductively coupled plasma (ICP) technique. The concentration of several ions in the aqueous solution was measured before and after soaking the sand sample in water. The concentration of calcium ions in the water was slightly increased (by around 20 mg/L), which could be due to the calcite dissolution. The increase in calcium ions is minimal, and no change was observed for the concentration of all other ions. Therefore, the water treatment did affect much on the structure of the consolidated sand sample, as confirmed by the 500 μm SEM images, where almost the same structures were obtained before and after soaking the sand sample in water.

Figure 8:
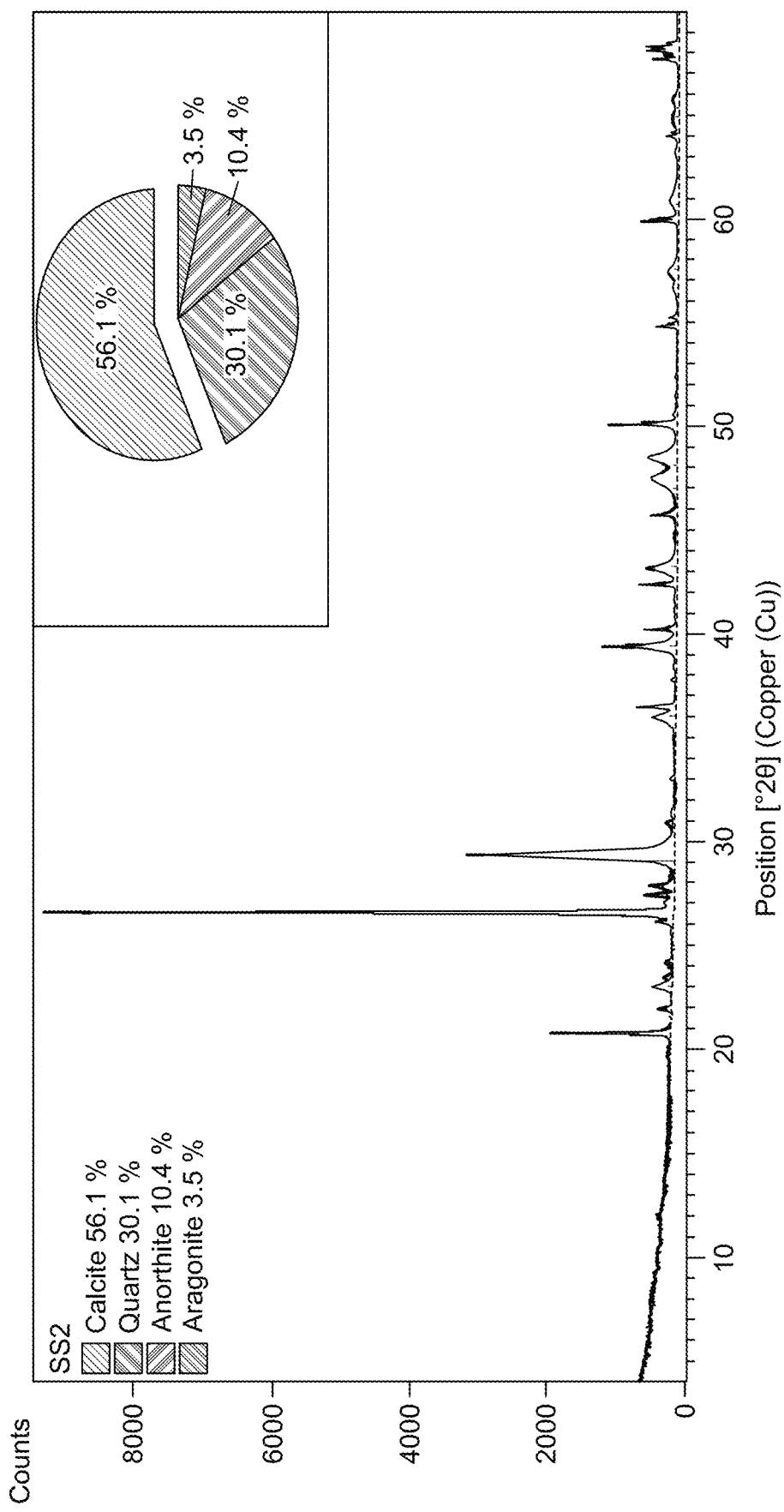
FIG. 8 depicts a mineralogical composition of the consolidated sand sample after toluene treatment, according to certain embodiments.
Figure 9:
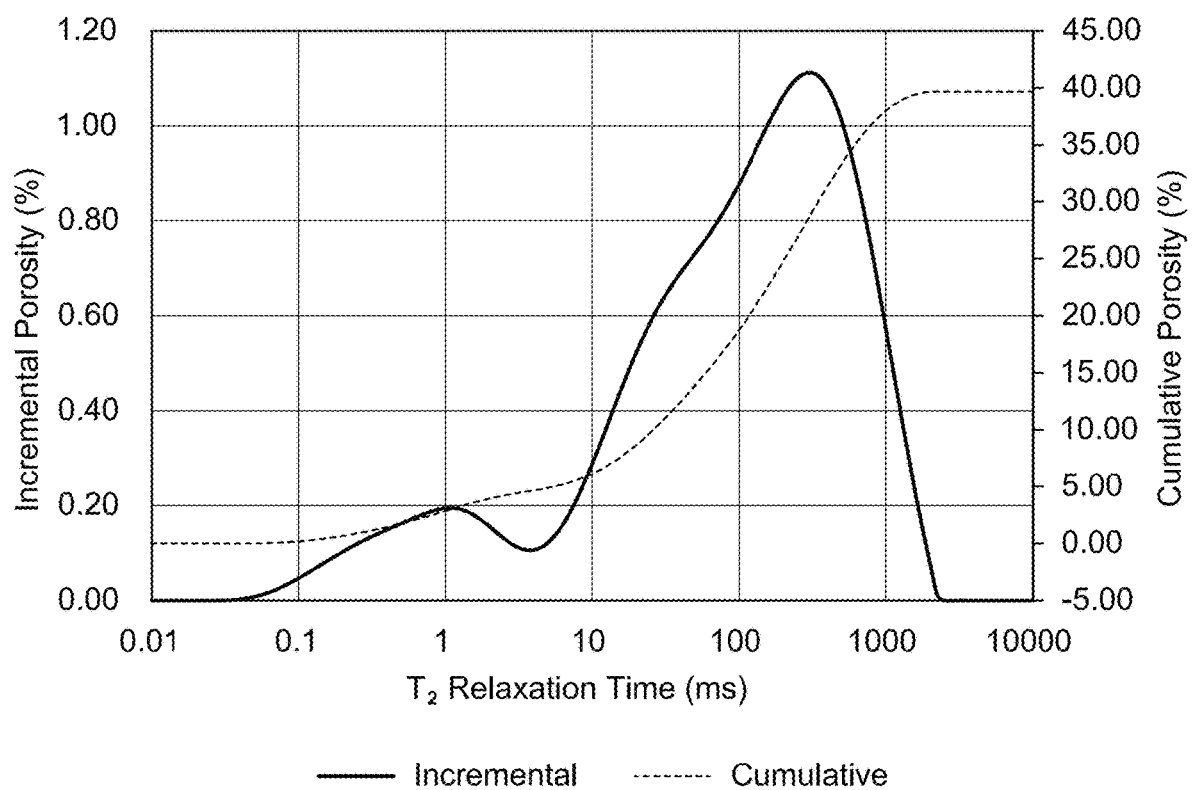
FIG. 9 depicts NMR results for the consolidated sand sample, after soaking the sample in toluene, according to certain embodiments.
Figure 10A:
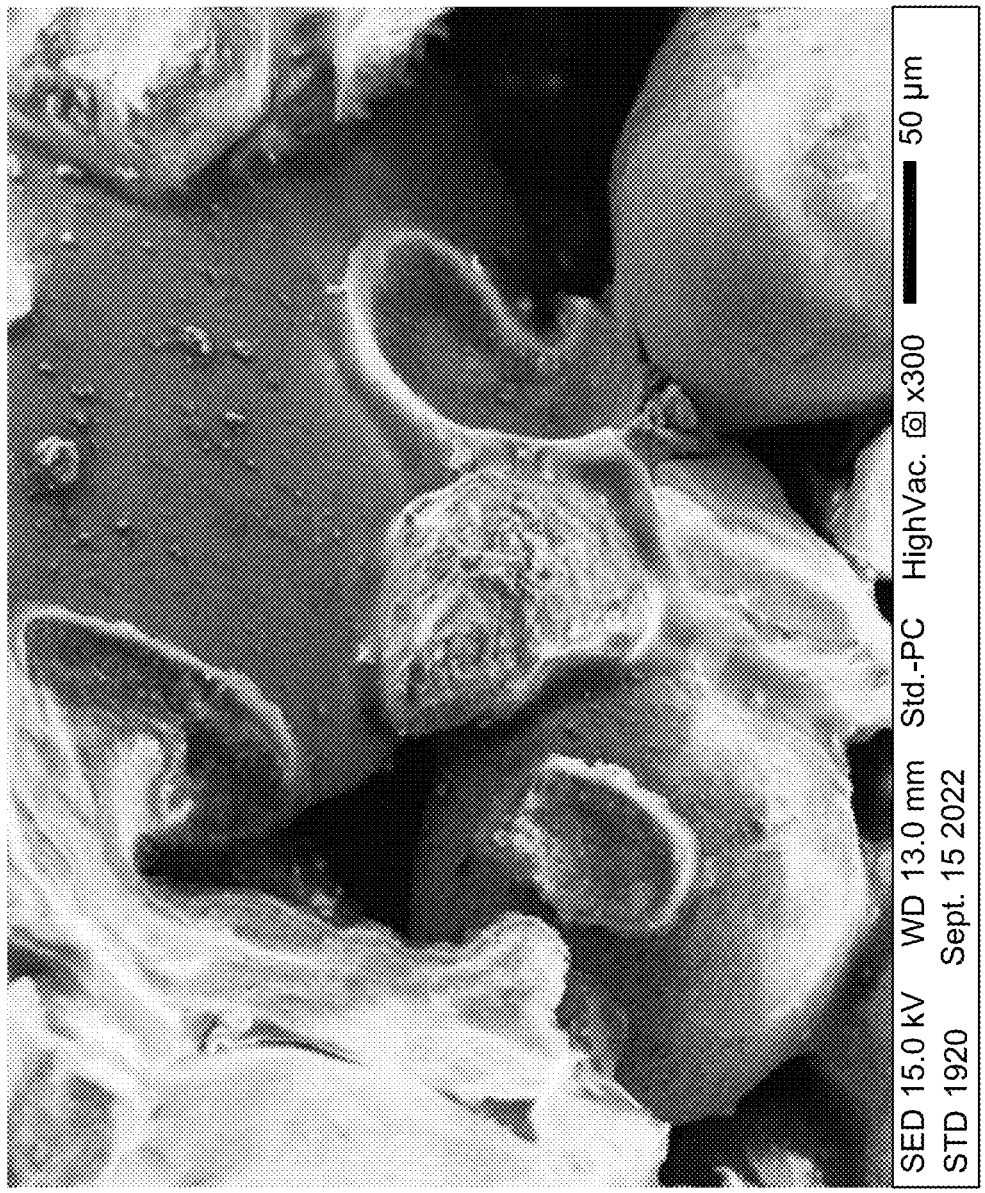
FIG. 10A-FIG. 10B depict SEM images for the consolidated sand sample before toluene treatment, at 50 and 500 μm, respectively, according to certain embodiments.
Figure 10B:
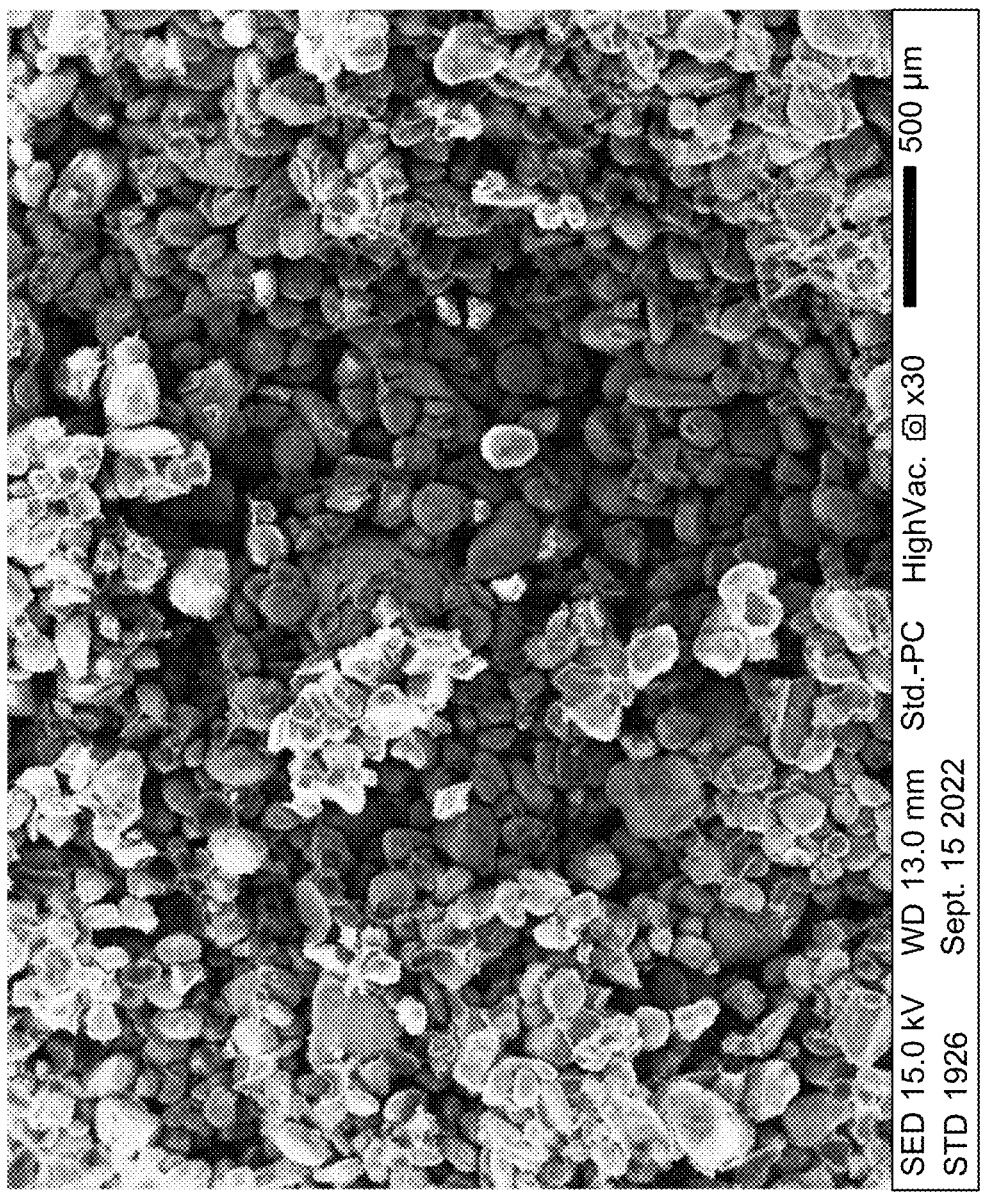
Figure 10C:
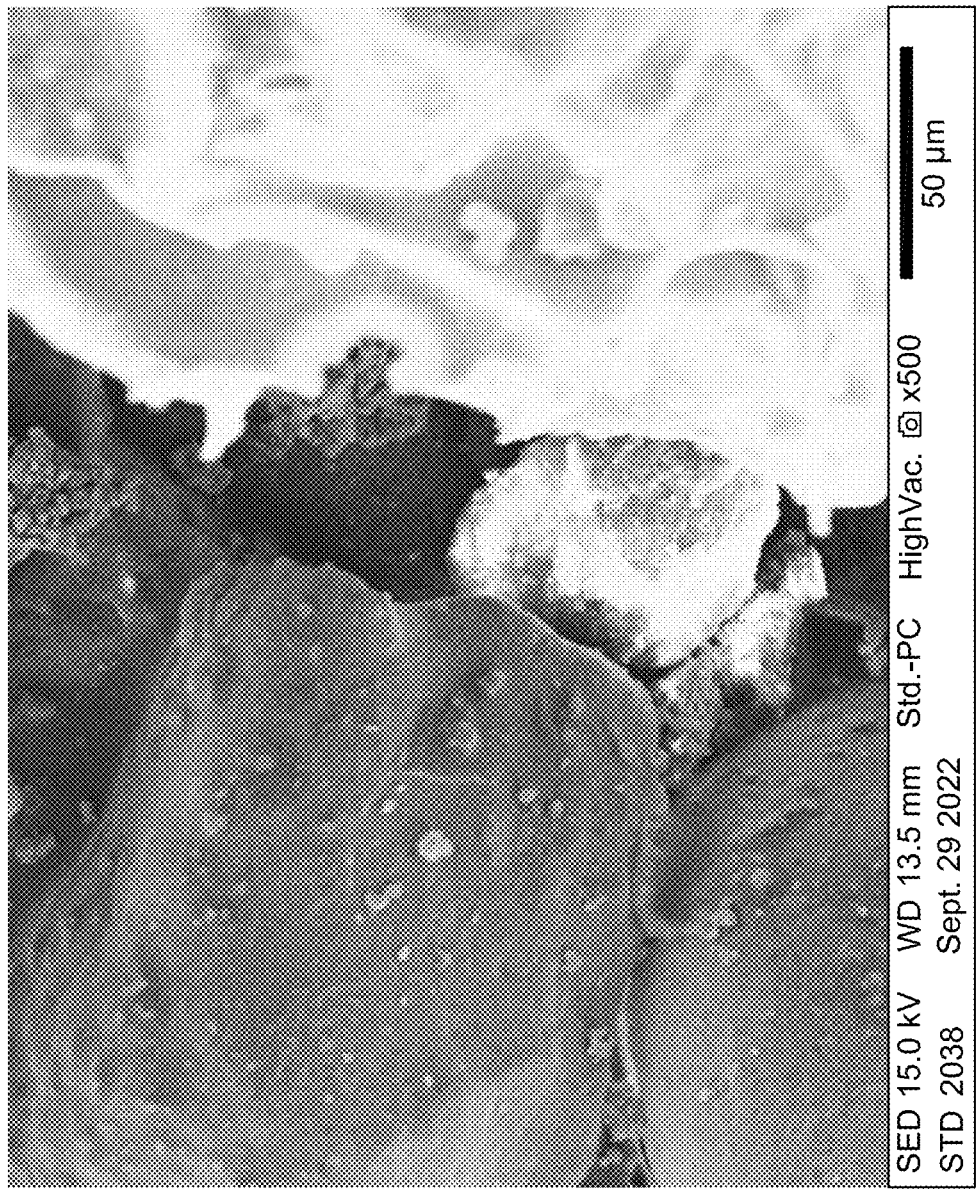
FIG. 10C-FIG. 10D depict SEM images for the consolidated sand sample after toluene treatment, at 50 and 500 μm, respectively, according to certain embodiments.
Figure 10D:
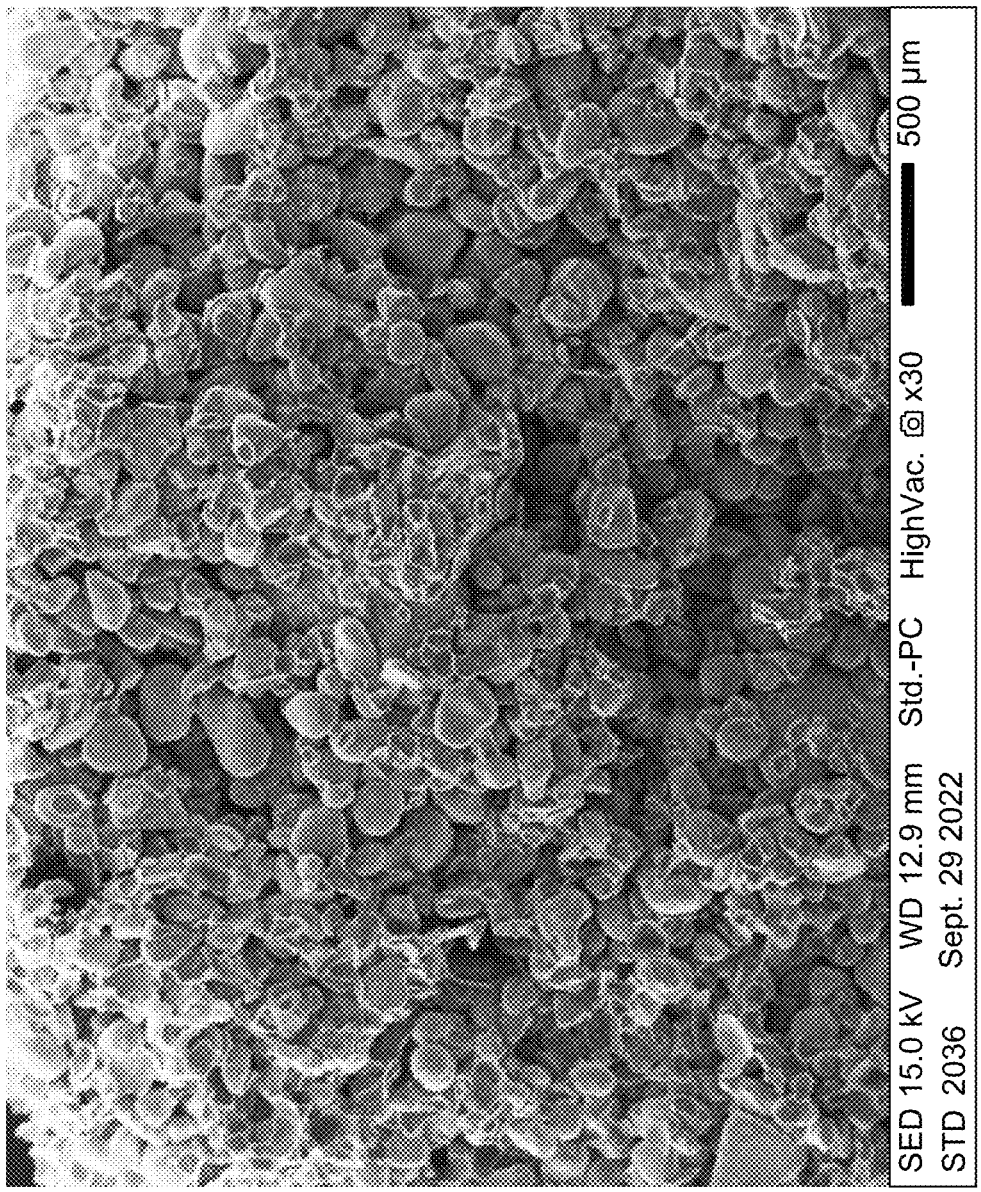

The alteration in rock properties induced by soaking the consolidated sand sample in toluene was studied. FIG. 8 shows the rock composition after soaking the consolidated sand in toluene for 24 hours. The main observation here is the high percentage of calcite. It is expected that toluene will not dissolve the carbonate minerals; hence, high calcite percentage was observed after treating the sand with toluene. After that, the T2 relaxation time was measured for the consolidated sand sample after toluene treatment, as provided in FIG. 9. The sample was treated with toluene, then cleaned and saturated with fresh water, which could reduce the uncertainty of NMR measurements by using the same saturation fluid. Similar to the results obtained after the water treatment, two T2 peaks can be observed, however, with higher signal intensity. The increase in the NMR signal could indicate the presence of a small portion of toluene within the sample since the toluene has a hydrogen index (HI) higher by 4 times compared to the HI of water. Overall, the NMR results indicate an increase in the core porosity after soaking the sand in toluene without reducing the sample integrity. The physical investigation of the sand sample after toluene treatment revealed that the sand sample has good consolidation characteristics, and this was confirmed by measuring the rock strength. Moreover, FIGS. 10A-10D show the SEM images for the sand sample before and after toluene treatment at 50 μm and 500 μm, respectively. Comparing the SEM images showed no difference in the atom and mass percentages, and the dominant elements were preserved after the toluene treatment.

Figure 11:
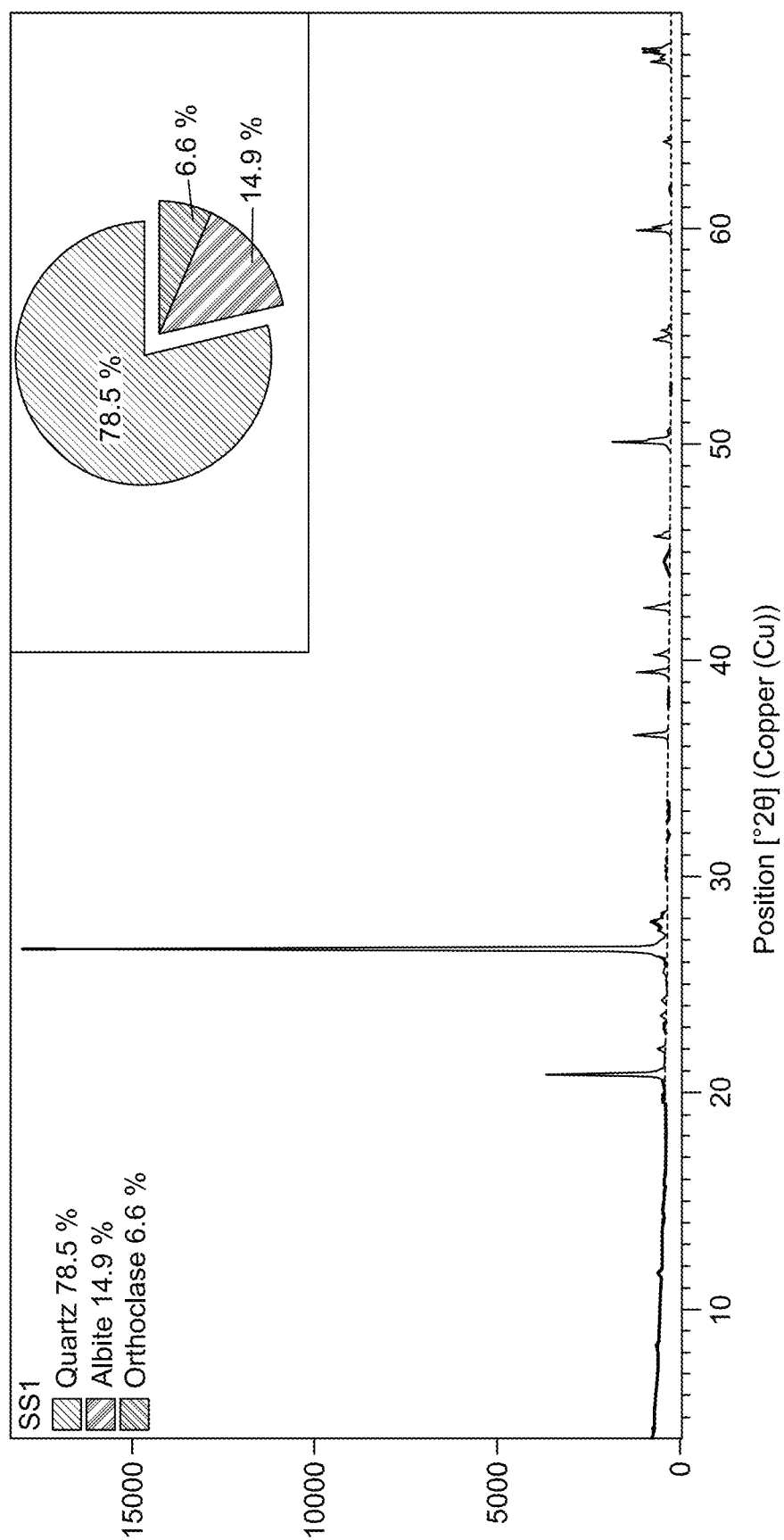
FIG. 11 depicts XRD results for the consolidated sand sample after HCl treatment, according to certain embodiments.
Figure 12:
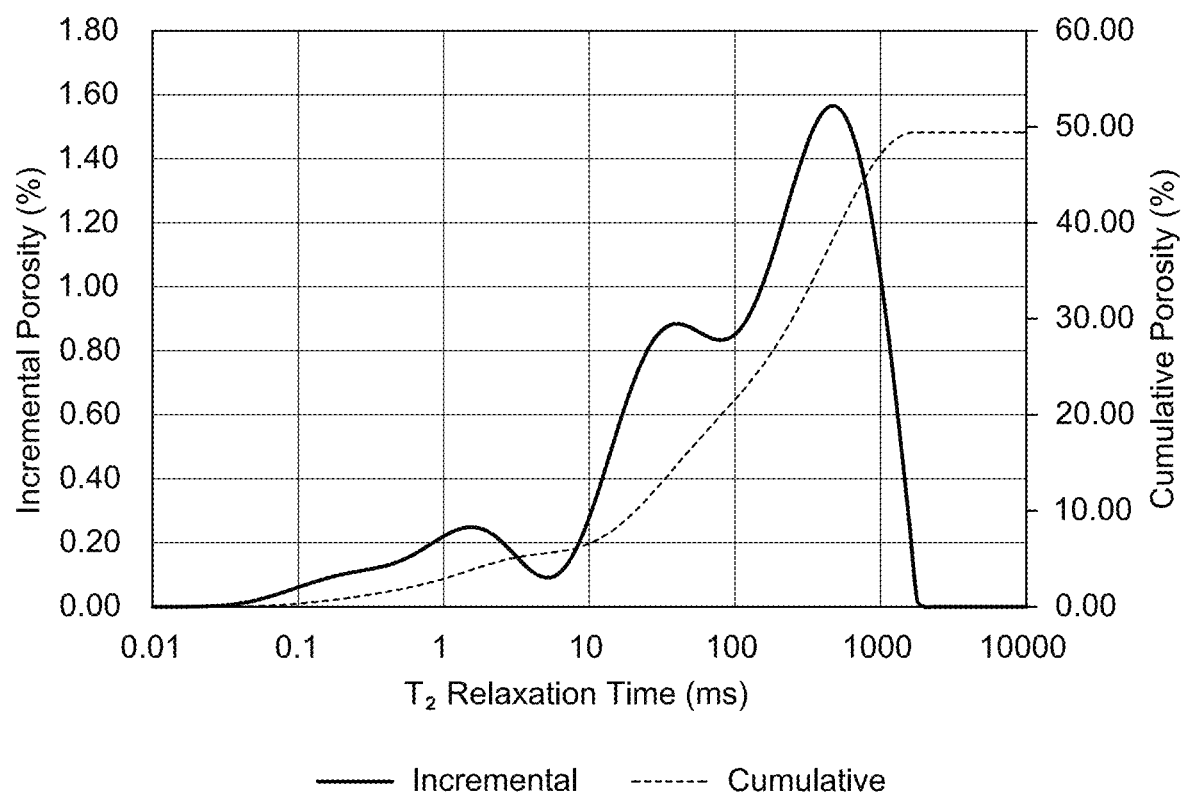
FIG. 12 depicts NMR results for the consolidated sand sample after HCl treatment, according to certain embodiments.
Figure 13A:
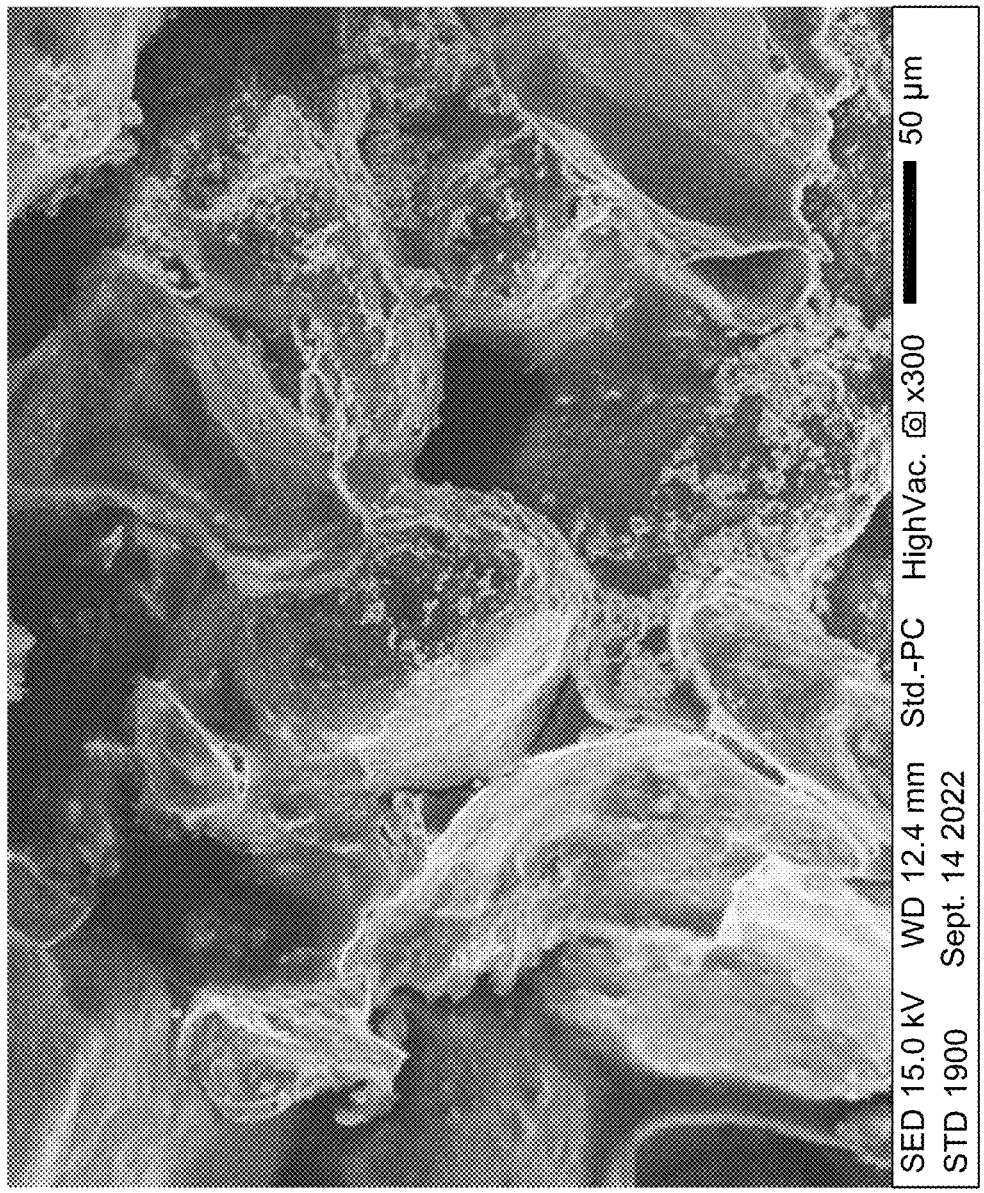
FIG. 13A-FIG. 13B depict SEM images for the consolidated sand sample before treating the consolidated sand sample with 15 wt. % HCl, at 50 and 500 μm, respectively, according to certain embodiments.
Figure 13B:
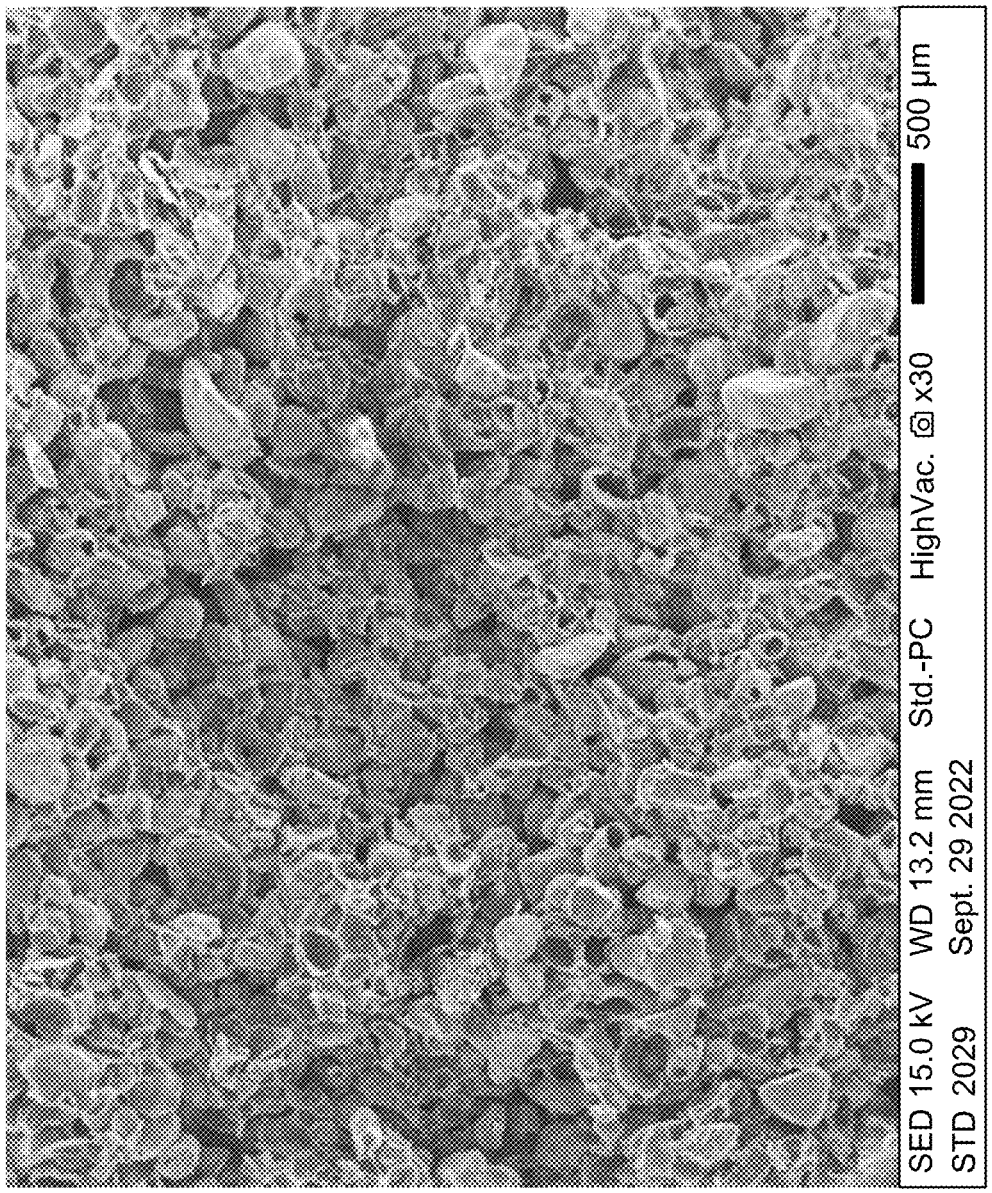
Figure 13C:
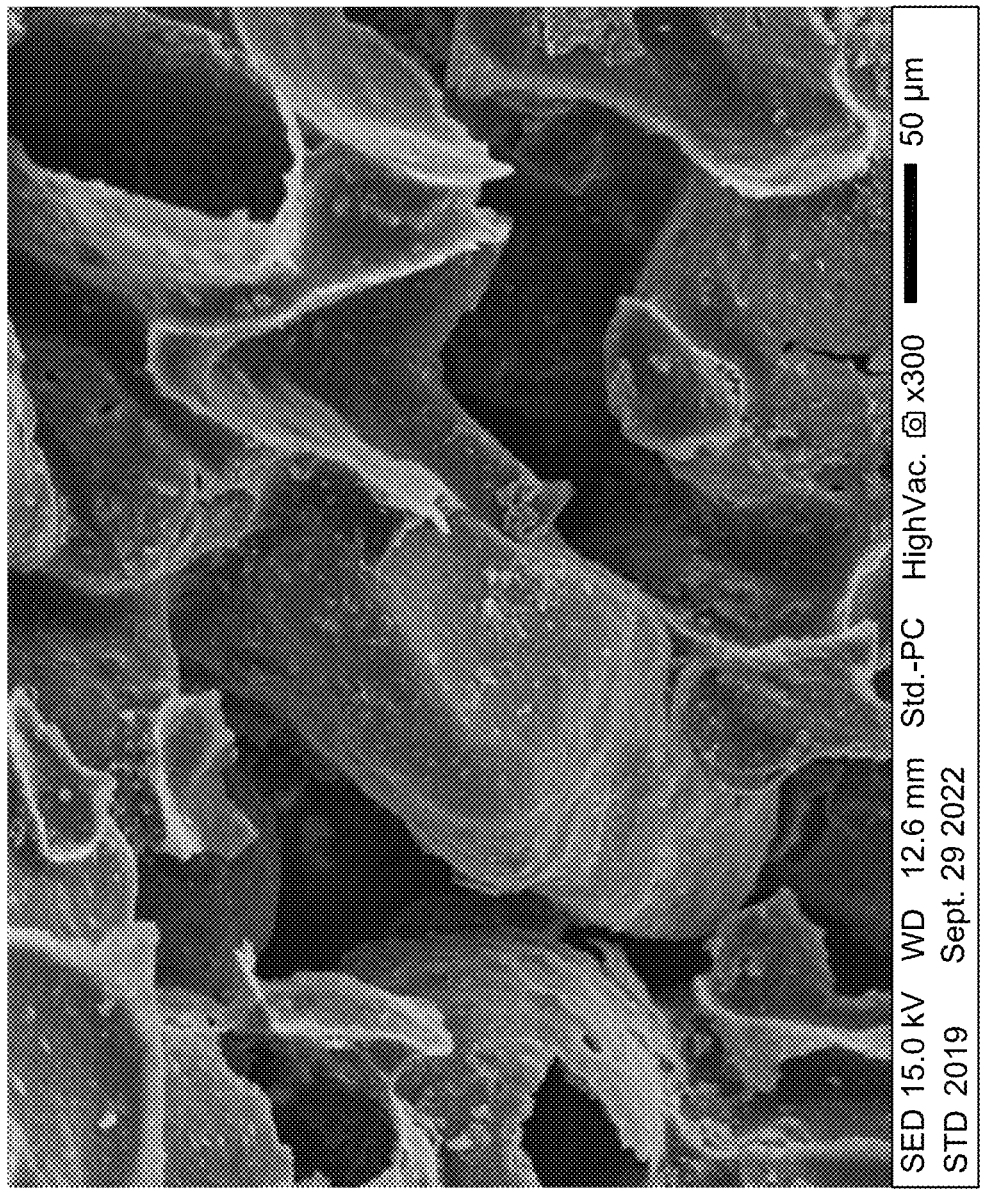
FIG. 13C-FIG. 13D depict SEM images for the consolidated sand sample after treating the consolidated sand sample with 15 wt. % HCl, at 50 and 500 μm, respectively, according to certain embodiments.
Figure 13D:
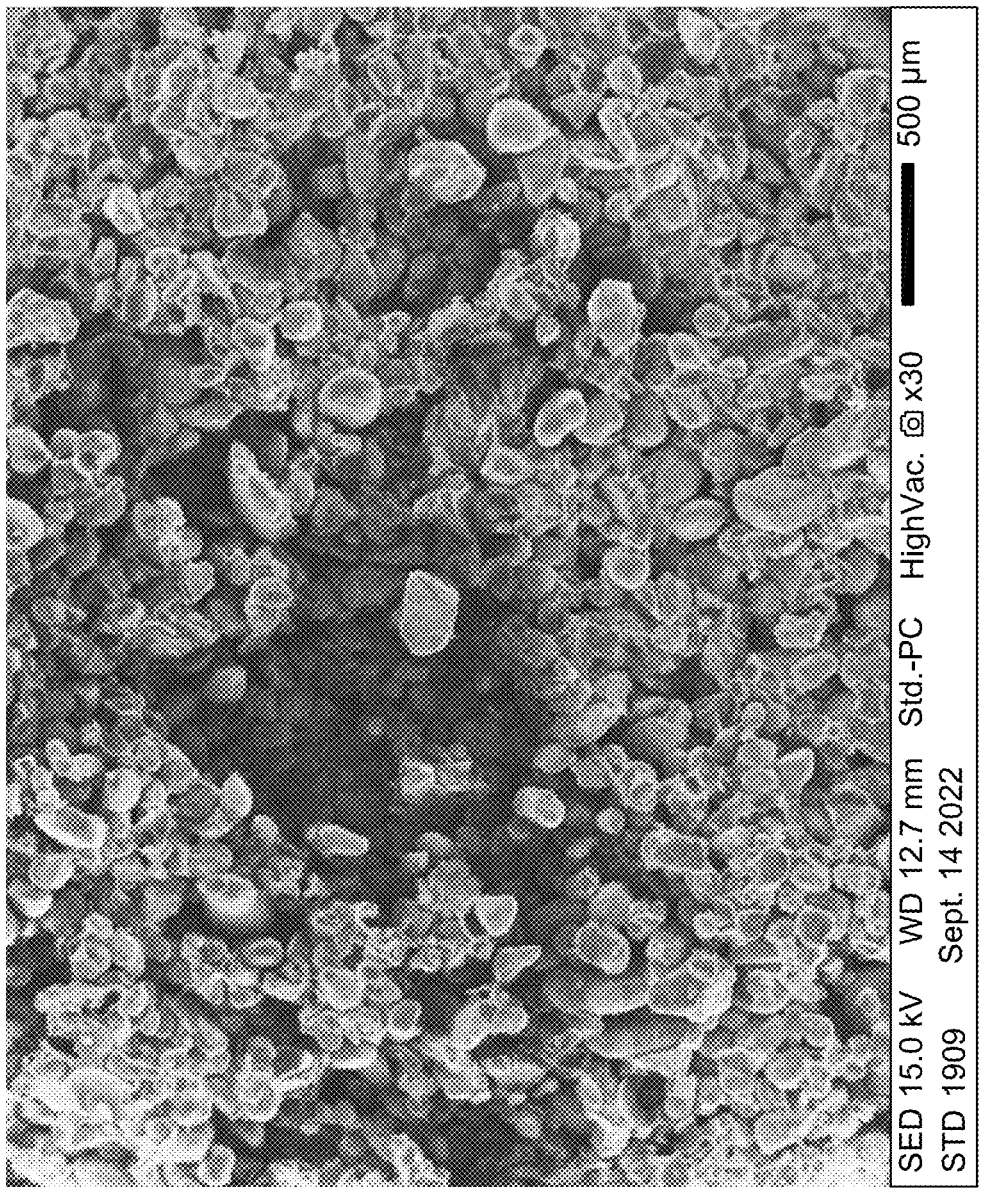

The interactions between 15 wt. % HCl and the consolidated sand were examined by evaluating the rock mineralogy, NMR response, and microscopic structure. HCl is a strong acid that can dissolve the cementing materials between the sand particles. The XRD analysis for the sand sample after HCl treatment (FIG. 11) indicates that the calcium percentage was significantly reduced. Also, the NMR results (FIG. 12) showed a considerable increase in the pore volume, suggesting that minimizing the use of strong acids for treating such consolidated sand is preferable. Furthermore, the mineral dissolution by HCl was further examined using SEM analysis. FIGS. 13A-13D show the SEM images for the consolidated sand sample before and after treating the sample with 15 wt. % HCl, respectively. The 50 μm SEM images showed a reduction in the number of small particles on the grain surface after the HCl treatment. The EDS analysis confirmed the decrease in the calcium ions. Overall, HCl is a strong acid that can significantly change the properties of the consolidated sand by dissolving the cementing materials between the sand particles.

A comparison analysis is conducted to determine the impact of treating the consolidated sand sample with fresh water, toluene, and HCl acid. The reduction in the sand weight due to the soaking in different solutions was examined. Table 1 summarizes the impact of fluid types on dissolving the consolidated sand sample.

TABLE 1

The reduction in the weight of the consolidated sand by soaking in different fluids.

| Fluid | Water | Toluene | 15 wt. % HCl |
|---|---|---|---|
| Sample weight before treatment (g) | 5.82 | 5.89 | 5.43 |
| Sample weight after treatment (g) | 5.79 | 5.75 | 3.16 |
| The reduction in the sample weight (%) | 0.3% | 2.5 | 42% |

Figure 14:
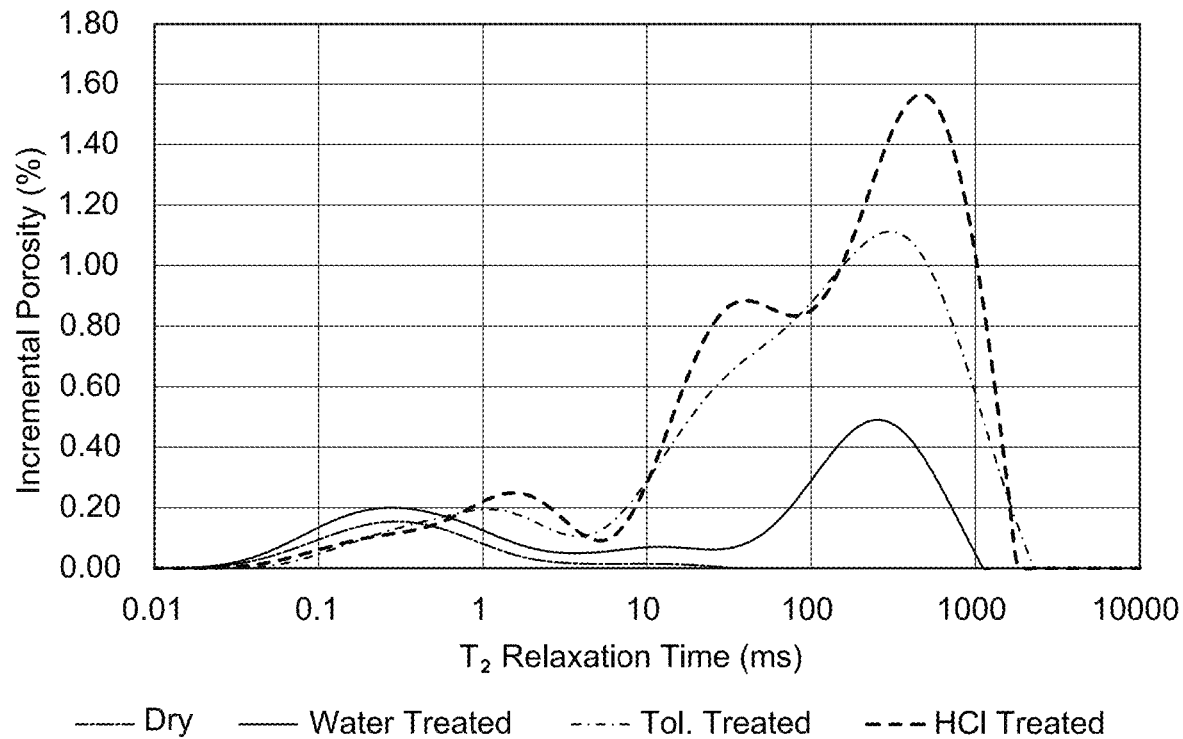
FIG. 14 depicts NMR results for the consolidated sand sample after treatments including dry, water, toluene, and HCl treatments, according to certain embodiments.

Soaking the sample in water showed almost no change (i.e., 0.3%) in the sample weight, while using toluene showed a reduction of 2.5% (almost negligible too) in the sand sample weight. However, soaking the consolidated sand in HCl reduced the sample weight by 42%. The XRD and ICP analyses indicate a considerable calcium dissolution by HCl. Moreover, the NMR results for the consolidated sand sample after different treatments are shown in FIG. 14. HCl showed the highest T2 signal, which could be attributed to increased pore space due to the minerals' dissolution. At the same time, the increase in NMR signal after toluene could be due to the high hydrogen index for the toluene, increasing the signal intensity. The NMR results can be used to estimate rock permeability utilizing different models. In the present disclosure, SDR (Schlumberger-Doll-Research) model was used to estimate the rock permeability. The original permeability is around 370 millidarcy (mD); applying toluene treatment showed a slight increase in the permeability (to about 410 mD). However, using HCl increased the permeability significantly (to around 533 mD).

Figure 15:
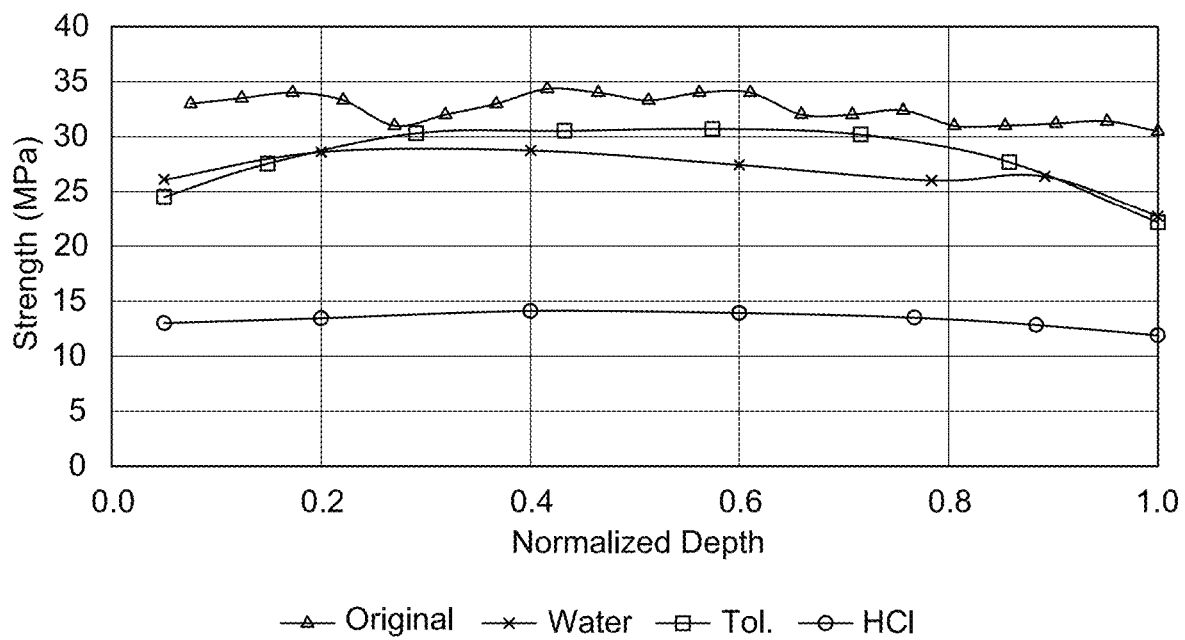
FIG. 15 depicts rock strength for the consolidated sand sample after treatments including dry, water, toluene, and HCl treatments, according to certain embodiments.

Finally, the rock strength was evaluated using the scratch test, FIG. 15 shows the strength along the consolidated sand sample after different treatments. Soaking the consolidated sand sample in water and toluene showed a slight reduction in strength, less than 10% on average. However, treating the sample with HCl reduced the strength by around 50%.

The present disclosure provides a method for sand consolidation using enforced calcium and magnesium precipitation. Different measurements were carried out to assess the performance of the new consolidation method. The method 50 can significantly improve sand consolidation and increase the rock strength to 34 mega pascals (MPa), preferably 25-32 MPa, preferably 28-30 MPa. Soaking the consolidated sand sample in water and toluene showed minor alterations in the rock properties. However, using HCl lead to considerable rock mineral dissolution, which increases the permeability and reduces the rock strength by around 50%. The consolidated sand can withstand the water and toluene treatment, and the rock strength was reduced by less than 10%. The proposed sand consolidation treatment can significantly improve rock strength by utilizing the enforced calcium and magnesium precipitation.

Numerous modifications and variations of the present disclosure are possible in light of the above teachings. It is therefore to be understood that within the scope of the appended claims, the invention may be practiced otherwise than as specifically described herein.

The invention claimed is:

1. A method for consolidating a subterranean geologic formation, the method comprising:
   injecting a first composition, a second composition, and a third composition into the subterranean geologic formation, wherein the first composition comprises CaO, the second composition comprises MgO, and the third composition comprises $NH_4HF_2$;
   injecting a first thermochemical fluid comprising $NaNO_2$ and a second thermochemical fluid comprising $NH_4Cl$ into the subterranean geologic formation to raise a temperature of the subterranean geologic formation to 120-180° C.;
   reacting the third composition respectively with the first composition and the second composition to form $CaF_2$ and $MgF_2$ in the subterranean geologic formation; and
   precipitating the $CaF_2$ and the $MgF_2$ on sand grains of the subterranean geologic formation to bind the sand grains together into a consolidated matrix in the subterranean geologic formation.

2. The method of claim 1, further comprising injecting an acidic activator that is configured to activate an exothermal reaction between the $NaNO_2$ and the $NH_4Cl$.

3. The method of claim 2, wherein:
   the first thermochemical fluid comprising the $NaNO_2$ and the second thermochemical fluid comprising the $NH_4Cl$ are injected into the subterranean geologic formation to form a mixture therein, and
   the acidic activator is then injected into the mixture.

4. The method of claim 3, wherein:
   the first thermochemical fluid comprising the $NaNO_2$ and the second thermochemical fluid comprising the $NH_4Cl$ are injected into the subterranean geologic formation in batches to form batches of mixtures, and
   the acidic activator is injected into each of the batches of mixtures.

5. The method of claim 2, wherein the acidic activator is pre-mixed with one of the first thermochemical fluid comprising the NaNO$_2$ or the second thermochemical fluid comprising the NH$_4$Cl before injecting into the subterranean geologic formation.

6. The method of claim 2, wherein the acidic activator comprises acetic acid.

7. The method of claim 2, wherein the acidic activator is present at a concentration of 7-13% by volume of a total volume of the first thermochemical fluid comprising the NaNO$_2$ and the second thermochemical fluid comprising the NH$_4$Cl.

8. The method of claim 7, wherein:
the NH$_4$Cl is present at a concentration of 2-4 moles per liter (mol/L) in the first thermochemical fluid, and
the NaNO$_2$ is present at a concentration of 2-4 mol/L in the second thermochemical fluid.

9. The method of claim 1, wherein the first thermochemical fluid comprising the NaNO$_2$ and the second thermochemical fluid comprising the NH$_4$Cl are injected into the subterranean geologic formation to raise and maintain the temperature of the subterranean geologic formation to 120-180° C. for 4-10 hours.

10. The method of claim 1, wherein the first composition comprises the CaO and water, the second composition comprises the MgO and water, and the third composition comprises the NH$_4$HF$_2$ and water.

11. The method of claim 1, wherein the sand grains of the subterranean geologic formation have an average particle size of less than 0.6 millimeters (mm) before the first composition, the second composition and the third composition are injected into the subterranean geologic formation.

12. The method of claim 1, wherein the consolidated matrix comprises 40-50% quartz, 35-45% calcite, and 5-15% anorthoclase.

13. The method of claim 1, wherein soaking the consolidated matrix in toluene for 24 hours, draining then drying reduces a weight of the consolidated matrix by less than 5%.

14. The method of claim 1, wherein soaking the consolidated matrix in water for 24 hours, draining then drying reduces a weight of the consolidated matrix by less than 2%.

15. The method of claim 1, wherein soaking the consolidated matrix in 15 wt. % HCl for 24 hours, draining then drying reduces a weight of the consolidated matrix by 40-50%.

* * * * *